United States Patent
Lu et al.

(10) Patent No.: US 12,276,843 B2
(45) Date of Patent: Apr. 15, 2025

(54) FIBER OPTIC CONNECTORS AND FIBER OPTIC CONNECTION SYSTEMS

(71) Applicant: COMMSCOPE TECHNOLOGIES LLC, Hickory, NC (US)

(72) Inventors: Yu Lu, Eden Prairie, MN (US); Ryan Kostecka, Waconia, MN (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 377 days.

(21) Appl. No.: 17/637,775

(22) PCT Filed: Aug. 24, 2020

(86) PCT No.: PCT/US2020/047615
§ 371 (c)(1),
(2) Date: Feb. 23, 2022

(87) PCT Pub. No.: WO2021/041305
PCT Pub. Date: Mar. 4, 2021

(65) Prior Publication Data
US 2022/0299713 A1   Sep. 22, 2022

Related U.S. Application Data

(60) Provisional application No. 62/891,842, filed on Aug. 26, 2019, provisional application No. 63/003,988, filed on Apr. 2, 2020.

(51) Int. Cl.
*G02B 6/36* (2006.01)
*G02B 6/38* (2006.01)
*G02B 6/44* (2006.01)

(52) U.S. Cl.
CPC ........ *G02B 6/3825* (2013.01); *G02B 6/3849* (2013.01); *G02B 6/3897* (2013.01); *G02B 6/4471* (2013.01)

(58) Field of Classification Search
CPC .. G02B 6/3825; G02B 6/3849; G02B 6/3897; G02B 6/4471; G02B 6/389; G02B 6/36
See application file for complete search history.

(56) References Cited

U.S. PATENT DOCUMENTS 6,151,432 A    11/2000   Nakajima et al.
7,090,407 B2*   8/2006   Melton ................ G02B 6/4433
                                                      385/62

(Continued)

FOREIGN PATENT DOCUMENTS

JP         11002744 A     1/1999
JP      2017504843 A     2/2017

(Continued)

OTHER PUBLICATIONS

Extended European Search Report for Application No. 20859309.5 mailed Sep. 1, 2023.

(Continued)

*Primary Examiner* — Jennifer Doan
(74) *Attorney, Agent, or Firm* — Merchant & Gould P.C.

(57) ABSTRACT

The present disclosure relates to a system for making or assembling fiber optic connectors that allows a pre-terminated fiber optic cable to be made compatible with any number of different styles or types of fiber optic connectors or fiber optic adapters. A connector core of the system can be used as a stand-alone connector with a small form-factor adapter.

28 Claims, 23 Drawing Sheets

(56) References Cited

U.S. PATENT DOCUMENTS

| | | | |
|---|---|---|---|
| 7,270,487 B2 * | 9/2007 | Billman | G02B 6/3846 385/60 |
| 7,467,896 B2 | 12/2008 | Melton et al. | |
| 7,614,797 B2 | 11/2009 | Lu et al. | |
| 7,744,288 B2 | 6/2010 | Lu et al. | |
| 7,802,926 B2 | 9/2010 | Leeman et al. | |
| 8,556,520 B2 | 10/2013 | Elenbaas et al. | |
| 9,557,493 B2 | 1/2017 | Wu et al. | |
| 9,733,436 B2 | 8/2017 | Van Baelen et al. | |
| 9,810,858 B2 | 11/2017 | Gniadek et al. | |
| 10,061,091 B2 | 8/2018 | Kempeneers et al. | |
| 10,317,628 B2 | 6/2019 | Van Baelen et al. | |
| 10,338,323 B2 | 7/2019 | Lu et al. | |
| 10,359,577 B2 | 7/2019 | Dnnoux et al. | |
| 2001/0012428 A1 | 8/2001 | Nakajima et al. | |
| 2008/0175546 A1 | 7/2008 | Lu et al. | |
| 2015/0177467 A1 | 6/2015 | Gniadek et al. | |
| 2016/0209599 A1 | 7/2016 | Van Baelen et al. | |
| 2016/0209605 A1 | 7/2016 | Lu et al. | |
| 2018/0143381 A1 | 5/2018 | Liu et al. | |
| 2018/0284355 A1 | 10/2018 | Smith et al. | |
| 2019/0339461 A1 | 11/2019 | Dannoux et al. | |

FOREIGN PATENT DOCUMENTS

| | | |
|---|---|---|
| WO | 2009/076364 A2 | 6/2009 |
| WO | 2015/028433 A1 | 3/2015 |
| WO | 2016/005879 A1 | 1/2016 |
| WO | 2016/156610 A1 | 10/2016 |
| WO | 2020/167779 A1 | 8/2020 |
| WO | 2020/236512 A1 | 11/2020 |

OTHER PUBLICATIONS

Office Action for Japanese Patent Application No. 2022-51338A9 dated Feb. 27, 2024.

International Search Report and Written Opinion of the International Searching Authority for International Patent Application No. PCT/US2020/047615 mailed Dec. 2, 2020, 15 pages.

* cited by examiner

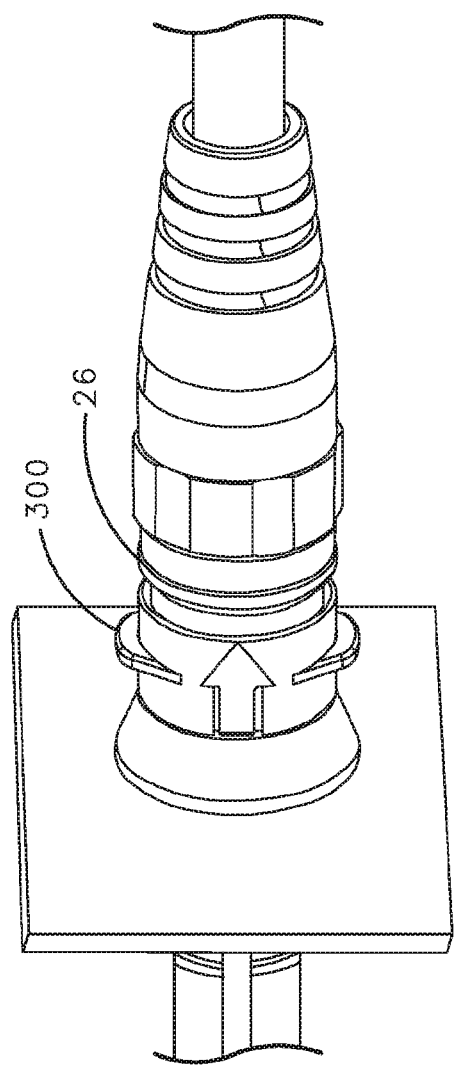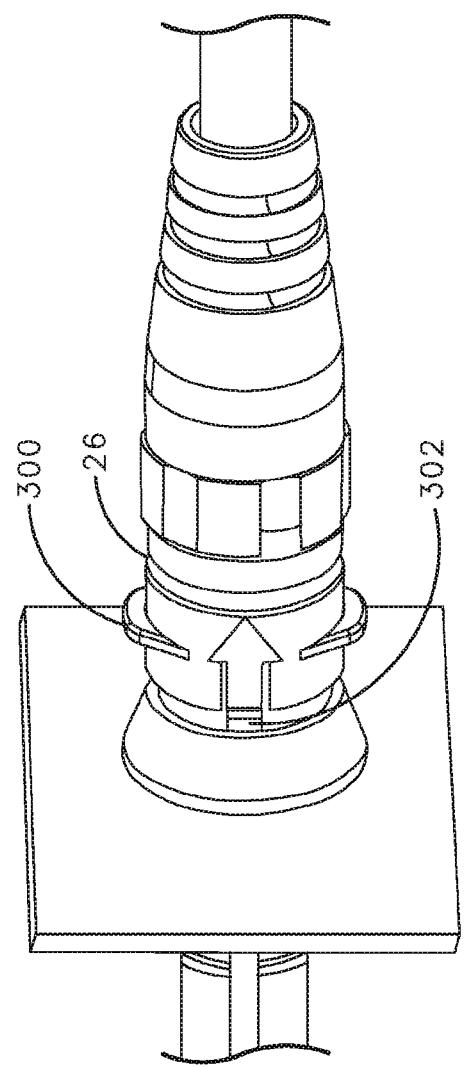

FIBER OPTIC CONNECTORS AND FIBER OPTIC CONNECTION SYSTEMS

CROSS-REFERENCE TO RELATED APPLICATIONS

This application is a National Stage Application of PCT/US2020/047615, filed on Aug. 24, 2020, which claims the benefit of U.S. Patent Application Ser. No. 62/891,842, filed on Aug. 26, 2019, and claims the benefit of U.S. Patent Application Ser. No. 63/003,988, filed on Apr. 2, 2020, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to systems for making fiber optic connectors, and fiber optic connectors made from such systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Ruggedized (i.e., hardened) fiber optic connection systems include fiber optic connectors and fiber optic adapters suitable for outside environmental use. These types of systems are typically environmentally sealed and include robust fastening arrangements suitable for withstanding relatively large pull loading and side loading. Example ruggedized fiber optic connection systems are disclosed by U.S. Pat. Nos. 7,467,896; 7,744,288 and 8,556,520.

It will be appreciated that a number of different types of ruggedized fiber optic connectors are available for outside environmental use. International Publication No. WO2015/028433 discloses a system for making fiber optic connectors in which a number of different ruggedized outer assemblies having different form-factors or configurations can be selectively mounted on a pre-terminated cable such that the pre-terminated cable can be customized to be compatible with a particular style or type of fiber optic connector or fiber optic adapter.

SUMMARY

Certain aspects of the present disclosure relate to a system for making or assembling fiber optic connectors that allows a pre-terminated fiber optic cable to be made compatible with any number of different styles or types of fiber optic connectors or fiber optic adapters. In certain examples, the system allows the selection of different shrouds, outer housings, outer fasteners and the like for mounting over a connector core that pre-terminates the end of a fiber optic cable. In certain examples, the different shrouds or outer housings can include different form factors, different keying arrangements, different shapes, and the like. Further, the shrouds can be used in combination with different fastening elements for fastening the final assembled connector to another fiber optic connector or a fiber optic adapter. Example fastening elements can include turn-to-secure fasteners (e.g., threaded fasteners and bayonet-style fasteners), slideable fasteners and snap-fit fasteners. In certain examples, different sealing arrangements can be provided on the different shrouds or housings. In certain examples, the outer shrouds or housings or fasteners can be part of outer connector assemblies that are preferably hardened/ruggedized. Certain aspects of the present disclosure relate to providing a connector core that can also be used as a small form-factor fiber optic connector that can be used directly (e.g., without any intermediate shroud over the core) in combination with a corresponding small form-factor ruggedized fiber optic adapter having a form-factor that complements the form-factor of the connector core. In certain examples, the connector core includes a seal that is adapted to seal with a shroud of a ruggedized (i.e., hardened) connector assembly when the core is inserted in the shroud, and is adapted to seal with the small form-factor adapter when the connector core is mated with the small form-factor adapter. In certain examples, the connector core includes a turn-to-secure fastener that is adapted to couple with an exterior of a shroud of a ruggedized connector assembly when the core used with the ruggedized connector assembly, and is adapted to couple with an exterior of the small form-factor adapter when the connector core is used directly with small form-factor adapter.

Another aspect of the present disclosure relates to a ruggedized fiber optic adapter having a small form-factor. In one example, the ruggedized fiber optic adapter has an elongate main body having a unitary, one-piece molded construction.

A further aspect of the present disclosure relates to a fiber optic adapter including a helical guide feature for rotationally guiding a fiber optic connector to a keyed rotational orientation. In one example, the guide feature is capable of rotationally guiding a fiber optic connector along a rotational range as the fiber optic connector is inserted into the fiber optic adapter. In certain examples, the rotational range can include at least 120 degrees, or at least 140 degrees, or at least 160 degrees or at least 180 degrees.

A further aspect of the present disclosure relates to a small form-factor connector core that can be used directly with a ruggedized small form-factor fiber optic adapter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 16 shows the small form-factor fiber optic adapter of FIG. 6 with the connector core installed in the ruggedized port and a retention collar in a non-retaining position;

FIG. 17 shows the small form-factor fiber optic adapter of FIG. 6 with the connector core installed in the ruggedized port and the retention collar in a retaining position;

DETAILED DESCRIPTION

Figure 1:
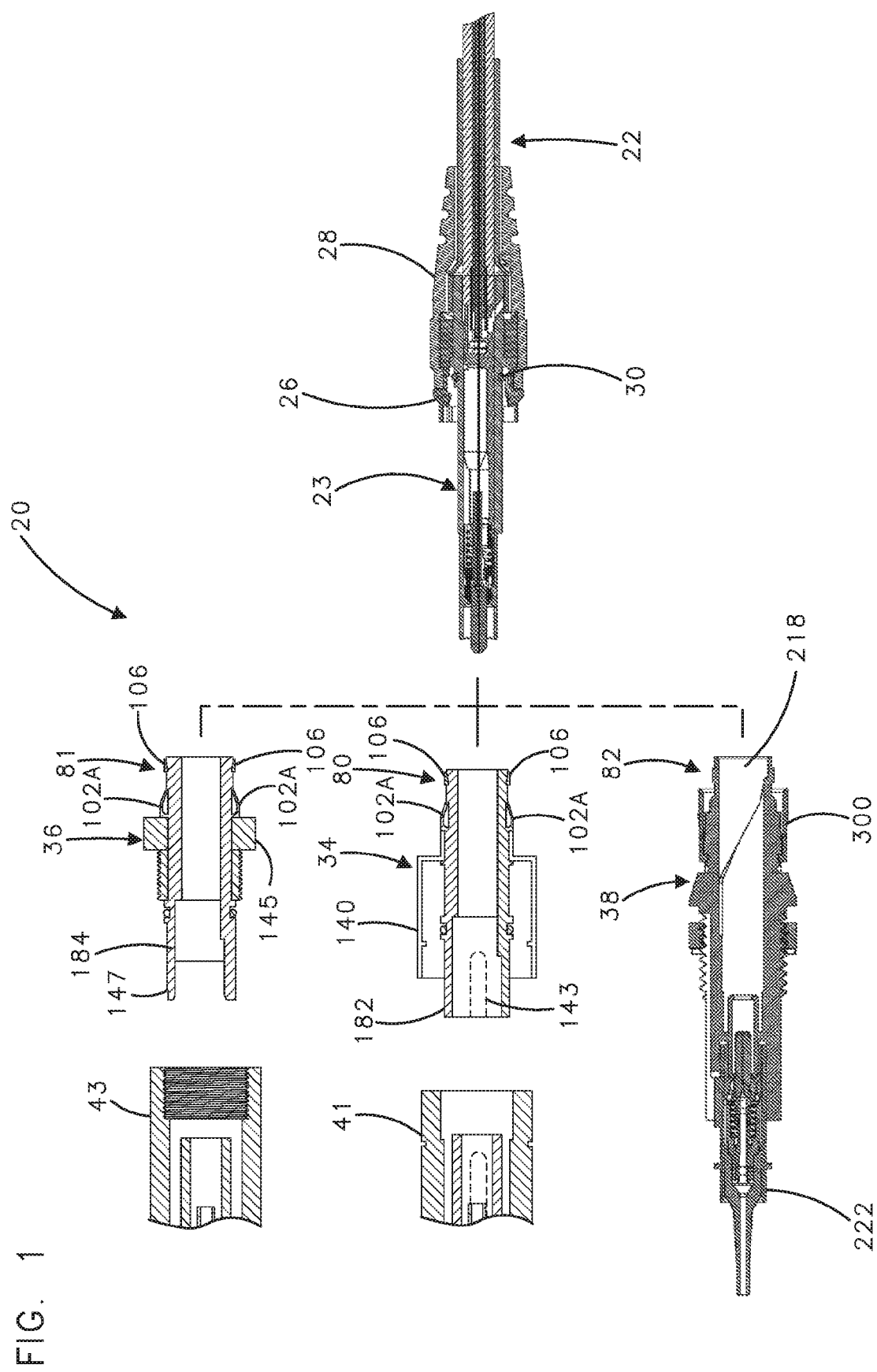
FIG. 1 illustrates a fiber optic connector system in accordance with the principles of the present disclosure.

FIG. 1 illustrates an example fiber optic connector assembly system 20 in accordance with the principles of the present disclosure. The fiber optic connector assembly system 20 allows a pre-terminated fiber optic cable 22 to be readily configured in one of any number of different connector configurations. The different connector configurations can include connector configurations having different connector housings/shrouds, different keying arrangements for keying with different styles or types of fiber optic adapters or fiber optic connectors, different fasteners compatible with different fiber optic adapters and fiber optic connectors, and the like. In certain examples, the different connector arrangements can include a plurality of different hardened (i.e., ruggedized) connector arrangements adapted to be compatible with different styles or types of hardened fiber optic connectors or hardened fiber optic adapters. It will be appreciated that the pre-terminated cable 22 can be fitted with a selected one of the different outer connector arrangements either in the field or in the factory to render the pre-terminated fiber optic cable compatible with a particular type of connector system (e.g., the pre-terminated fiber optic cable with the selected connector assembly mounted thereon is compatible and mateable with a particular fiber optic adapter style and/or a particular fiber optic connector style). In certain examples, the pre-terminate cable can include a connector core that is directly compatible with a fiber optic adapter.

Referring still to FIG. 1, the fiber optic connector assembly system 20 includes a connector core 23 terminating one end of the fiber optic cable 22. A turn-to-secure fastener 26 is rotatably mounted on the connector core 23, and a strain relief boot 28 is mounted on the turn-to-secure fastener 26. The turn-to-secure fastener 26 mounts on the connector core 23 adjacent a rear end of the connector core (i.e., adjacent at end to which the cable is secured). A seal 30 is mounted on the connector core 23 within an interior of the turn-to-secure fastener 26 (see FIG. 5). The fiber optic connector assembly system 20 also includes a number of different components, arrangements, assemblies or the like that can be selected and individually mounted on the connector core 23 and secured to the connector core 23 by the turn-to-secure fastener 26. The seal 30 can be configured to seal against the components, arrangements or assemblies when the components, arrangements or assemblies are coupled to the connector core 23. The various components, arrangements, and assemblies are depicted as including a dust cap 32 (see FIG. 2), a first hardened connector shroud and fastener arrangement 34, a second hardened connector shroud and fastener arrangement 36, and a small form-factor fiber optic adapter 38 having at least one ruggedized port for directly receiving the connector core 23.

It will be appreciated that the dust cap 32 can be secured over the connector core 23 to protect the connector core 23 and the terminated optical fiber or fibers supported thereby prior to coupling the connector core with any of its mating components such as the first arrangement 34, the second arrangements 36 or the small form-factor fiber optic adapter 38. It will be appreciated that the dust cap 32 is required to be removed from the connector core 23 prior to coupling the connector core with any of its mating components.

A first fiber optic connector assembly that results when the first hardened connector shroud and fastener arrangement 34 is mounted on the connector core 23 is compatible and mateable with a FastConnect™ fiber optic adapter 41 (shown schematically at FIG. 1) sold by Huawei Technologies Company Ltd. (see U.S. Pat. No. 9,557,493, which is hereby incorporated by reference in its entirety). A second fiber optic connector assembly that results when the second hardened connector shroud and fastening arrangement 36 is mounted on the connector core 23 is configured to be compatible with an Opti Tap™ fiber optic adapter 43 (shown schematically at FIG. 1) by Corning Cable Systems LLC (e.g., see U.S. Pat. No. 7,090,407, which is hereby incorporated by reference in its entirety). The small form-factor fiber optic adapter 38 includes a ruggedized port 39 adapted to directly receive the connector core 23 without requiring the use of an intermediate shroud for keying, alignment or sealing.

It will be appreciated that a fiber optic cable is preterminated by mounting a structure at the end of the cable that presents the optical fiber or fibers for optical connection by a de-mateable optical connection. For example, a fiber optic cable can be pre-terminated by mounting a ferrule at the end of the optical fiber or fibers of the cable in preparation for presenting the optical fiber as part of a ferruled optical connector. In other examples, a housing or other structure can be attached to the fiber optic cable and can function to align or position the optical fiber without the use of a ferrule as in the case of a ferrule-less fiber optic connector. In the depicted example, the fiber optic cable 22 is pre-terminated by mounting the connector core 23 at the end of the fiber optic cable 22 prior to assembling any of the hardened arrangements 34, 36 over the connector core 23.

Figure 3:
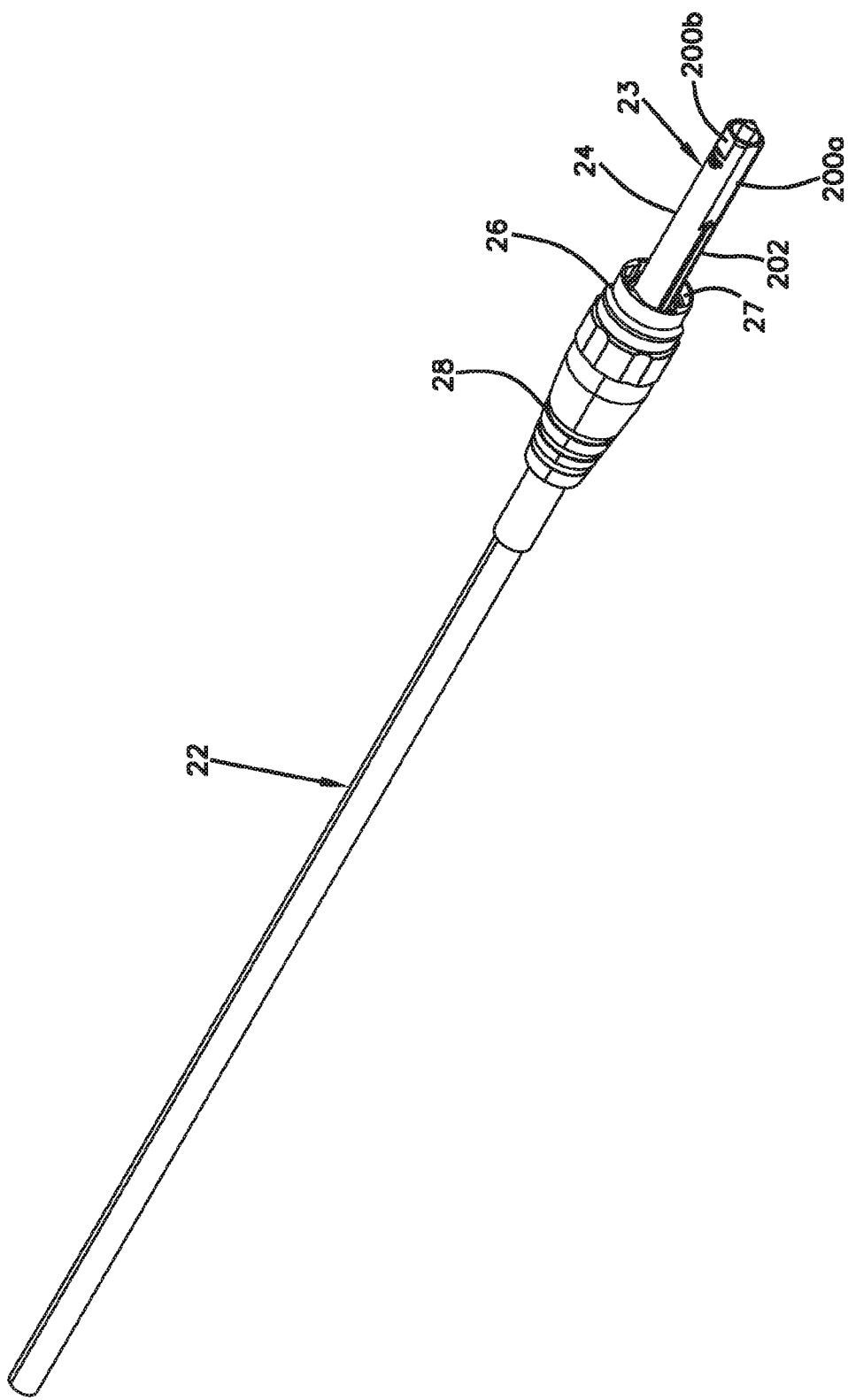
FIG. 3 is perspective view of the connector core of FIG. 2.

Referring to FIG. 3, the connector core 23 includes a connector core housing 24 that is elongated along a length that extends along a longitudinal axis 50. The connector core housing 22 includes a front plug end 52 positioned opposite from a rear cable attachment end 54. The front plug end 52 optionally has a form factor compatible with an SC type fiber optic adapter, but could have other form factors as well such as an LC connector form factor compatible with an LC fiber optic adapter. The fiber optic cable 22 is attached or secured to connector core 23 at the rear cable attachment end 54 of the connector core housing 24. For example, strength members (e.g., yarn type strength members such Aramid yarn or fiberglass) can be attached to the connector core 23 at the rear cable attachment end 54 by adhesive (e.g., epoxy), crimping or other means. The fiber optic cable 22 includes an outer jacket 56. The outer jacket 56 of the fiber optic cable 22 can be secured to the cable attachment end 54 of the connector core housing 24 by a sleeve 57 such as a shape memory sleeve (e.g., a heat-shrink sleeve). In certain examples, the heat-shrink sleeve can include an interior layer of adhesive for bonding the heat-shrink sleeve to the outer jacket 56 and to the connector core housing 24. The turn-to-secure fastener 26 is mounted over the connector core housing 24 and can be turned (e.g., rotated) relative to the connector core housing 24 about the longitudinal axis 50. The turn-to-secure fastener 26 is captured axially between an outer stop 47 (e.g., a shoulder) of the housing 24 and the front end of the sleeve 57 such that the fastener 26 is retained on the housing 24. The boot optionally can be turned in unison with the fastener 26 about the axis 50.

An optical fiber structure 58 includes a first section 60 routed longitudinally through the outer jacket 56 of the fiber optic cable and a second section 62 routed through the connector core body 24. The second section 62 of the optical fiber structure 58 defines a fiber tip 64 at the front plug end 52 of the connector core body 24. A front portion of the second section 62 of the optical fiber structure 58 is secured and supported within a ferrule 66. The ferrule 66 is spring biased in a forward direction relative to the connector core body 24 by a spring 68. An inner body 67 mounts within the connector core body 24 and includes a front end 69 that functions as a spring stop and a rear end 71 that can include structure for use in securing strength members of the fiber optic cable 22 to the connector core 23.

In the case where the ferrule 66 is directly mounted on the optical fiber of the fiber optic cable 22, the optical fiber structure 58 is an uninterrupted length of optical fiber where the first and second sections 60, 62 are all part of one continuous optical fiber. In a splice-on version of the connector arrangement, the first section 60 can be formed by a segment of optical fiber that is optically spliced (e.g., fusion spliced) to an optical fiber of the fiber optic cable 22 which forms the second section 62. In certain examples, optical splice can be located within the interior of the connector core body 24.

The connector core housing 24 includes the exterior stop 47 (e.g., a projection, a wall, rib, a shoulder or the like) positioned adjacent the cable attachment end 54 of the connector core housing 24. The stop 47 can include a forwardly facing positive stop surface 72 and a rearwardly facing positive stop surface 74. The surface 74 provides for axial retention of the fastener 26, while the surface 72 provides a positive stop adapted for engaging a corresponding stop surface 75 of the small form-factor fiber optic adapter 38 for stopping insertion of the connector core 23 into the small form-factor adapter 38 at a predetermined, fully-inserted location.

The turn-to-secure fastener 26 includes an interior coupling arrangement 27 (see FIGS. 18-21) adapted to couple with mating exterior coupling arrangement provided at components adapted to be coupled to the connector core 23. In certain examples, the interior and exterior coupling arrangements can include threaded configurations, bayonet-style configurations, and other interlock configurations. The interlock configurations can include configurations that interlock by snap-fit actions and configurations having stops that are rotated from non-overlapped positions to overlapped positions in which interference between the stops provide for axial retention of the turn-to-secure fastener 26.

Figure 2:
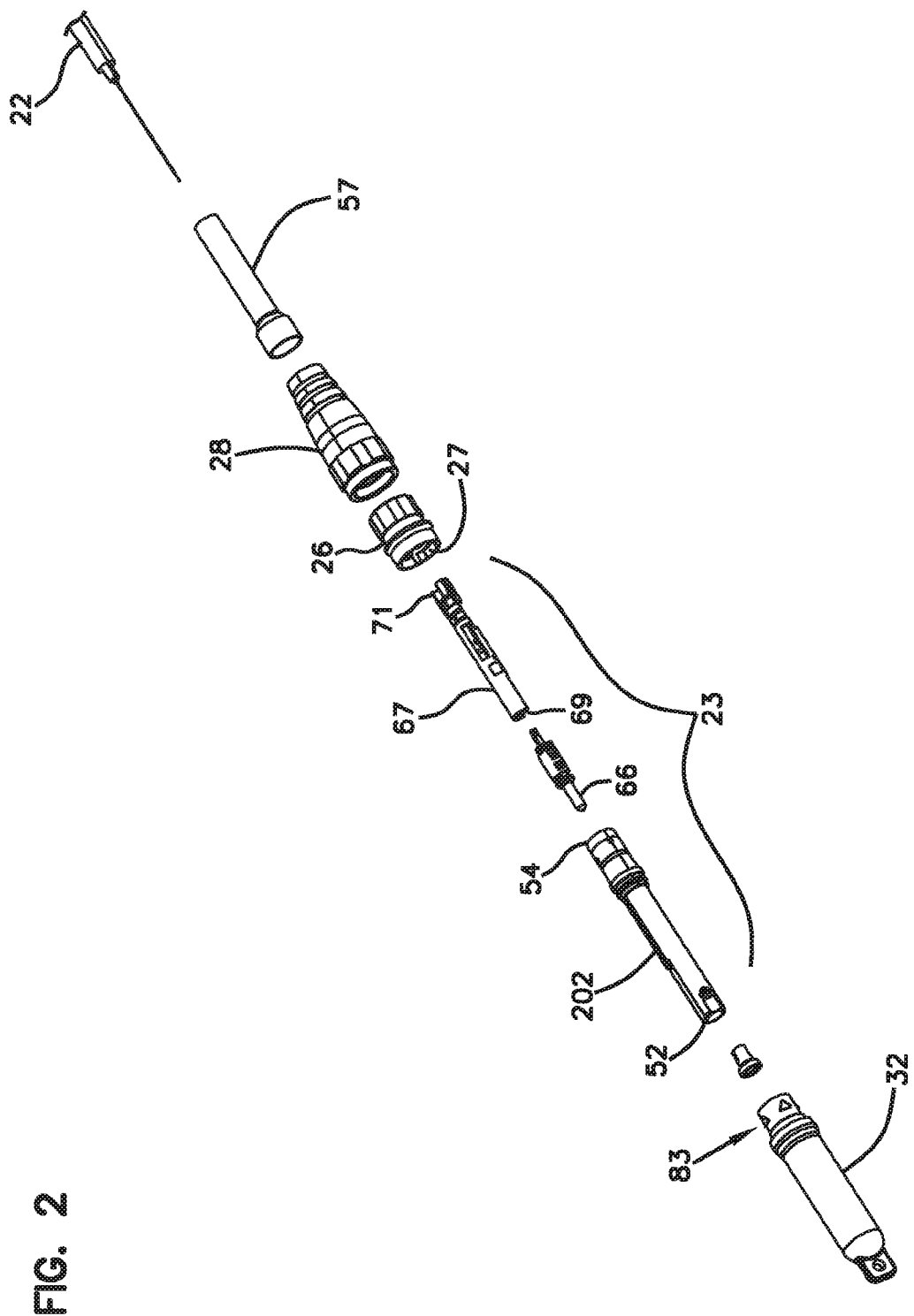
FIG. 2 is an exploded view of a connector core of the system of FIG. 1.

The interior coupling arrangement 27 (see FIGS. 18-21) of the fastener 26 is adapted to couple with mating exterior coupling arrangements 80-83 that respectively correspond to the first hardened connector shroud and fastener arrangement 34, the second hardened connector shroud and fastener arrangement 36, the small form factor adapter 38 and the dust cap 32. The exterior coupling arrangements 80-82 are shown at FIG. 1 and the exterior coupling arrangement 83 is shown at FIG. 2. The coupling interface formed between the interior and exterior coupling arrangements preferably provides two different interlock functions.

The first interlock function is adapted to inhibit rotation between the turn-to-secure fastener 26 and the corresponding mated exterior coupling arrangement. The first interlock function can be provided by a snap-fit arrangement. The snap-fit arrangement may provide a permanent interlock or a multi-use interlock. In the case of a permanent interlock, a snap-fit connection between the interior and exterior coupling arrangements is required to be broken to rotate the turn-to-secure fastener 26 from an interlocked rotational position (e.g., a coupled rotational position) to a non-interlocked position (e.g., a non-coupled rotational position). In contrast, if the snap-fit arrangement is adapted for multiple uses, the snap-fit arrangement can function as a detent that encourages the turn-to-secure fastener 26 to remain in an interlocked rotational position, but with sufficient torque allows the snap-fit arrangement to be disengaged without breaking the snap-fit arrangement to allow the turn-to-secure fastener 26 to be moved from the interlocked position to a non-interlocked position.

The second interlock function provided when the interior coupling arrangement 27 is mated with a corresponding one of the exterior coupling arrangements 80-83 relates to providing axially securement of the fastener 26. When the interior and exterior coupling arrangements are interlocked, the coupling arrangements are adapted to prevent the fastener 26 from being axially disengaged from the corresponding component to which the fastener 26 is coupled. The portions of the coupling arrangements that provide the axial retention function can include a plurality of stops that interlock (e.g., overlap) with respect to one another when the fastener 26 is rotated to a coupled rotational position such that interference between the interlocked stops prevents the fastener 26 from being axially removed from the corresponding component to which the fastener 26 is coupled.

Figure 22:
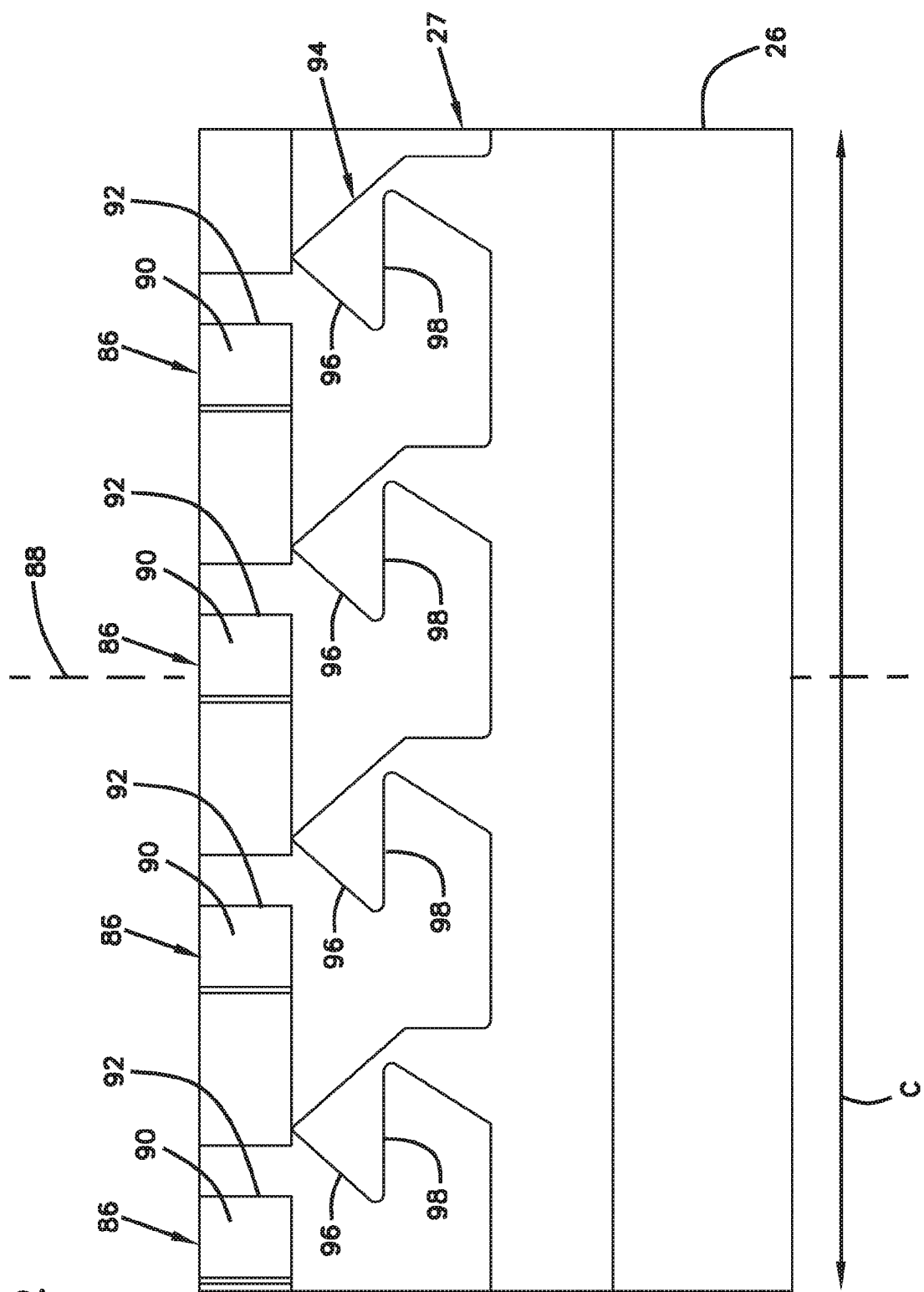
FIG. 22 is a plan view showing an example interior coupling arrangement of the turn-to secure fastener.

Referring to FIGS. 18-22, the interior coupling arrangement 27 includes a plurality of ramped snap-fit features 86 spaced uniformly about a central axis 88 of the fastener 26. Each of the snap-fit features 86 includes a ramp surface 90 and a stop surface 92. The interior coupling arrangement 27 also includes an axial retention arrangement 94 including a plurality of axial stops 96 spaced uniformly about the central axis 88. For ease of explanation, FIG. 22 shows the fastener 26 cut along its length and laid flat such that the entire circumference C of the interior of the fastener 26 is visible in plan view. The axial stops 96 include stop surfaces 98.

Figure 23:
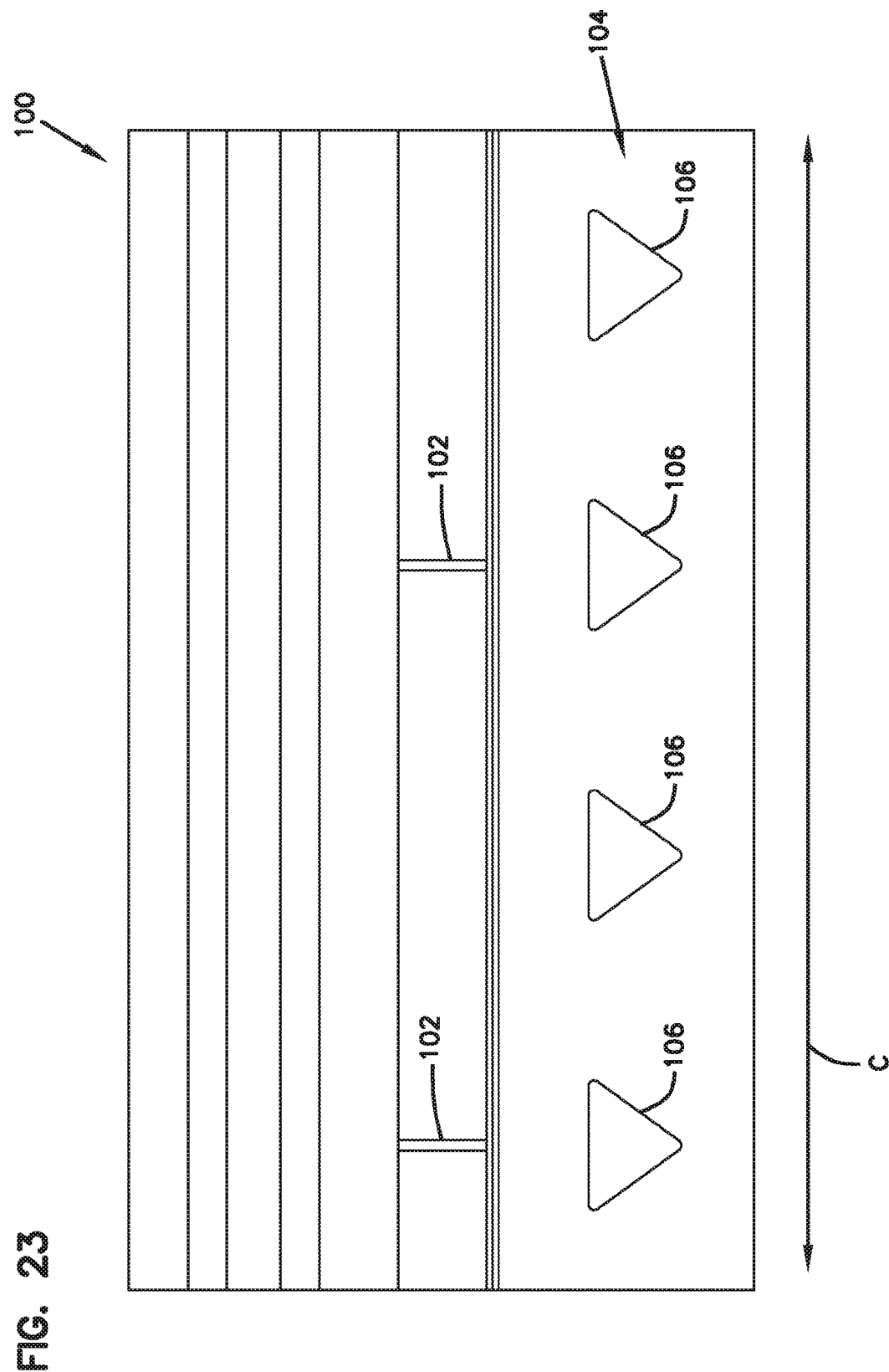
FIG. 23 is a plan view showing an example exterior coupling arrangement adapted to interlock with the interior coupling interface of FIG. 22.

FIG. 23 depicts an example exterior coupling arrangement 100 that can be representative of the coupling arrangements 80-83. At FIG. 23, the coupling arrangement has been cut and laid flat such that entire outer circumference of the coupling arrangement 100 is shown in plan view. The external coupling arrangement 100 includes snap-fit features 102 spaced apart from one another along the circumference C. The snap-fit features 102 can include catch elements or stops adapted to work in combination with the snap-fit features 86 of the interior coupling arrangement. In certain examples, the snap-fit features 102 can be detent features such as bumps. In other examples, the snap-fit features 102 can include latches such as beams. The beams can be configured to have a break-away function to allow movement of the turn-to-secure fastener 26 from a coupled rotational position to an un-coupled rotational position. In other examples, the snap-fit features 102 provide resistance to rotating the turn-to-secure fastener 26 from the coupled rotational position to the non-coupled rotational position, but that merely deform without breaking to allow movement of the turn-to-secure fastener 26 from the coupled rotational position to the non-coupled rotational position. The exterior coupling arrangement 100 also includes an axial retention arrangement 104 adapted to axially retain the turn-to-secure fastener 26 when the turn-to-secure fastener 26 is in the coupled rotational position. The axial retention arrangement 104 can include a plurality of axial stops 106 (e.g., triangular projections) spaced uniformly along the circumference C of the external coupling arrangement 100.

Figure 24:
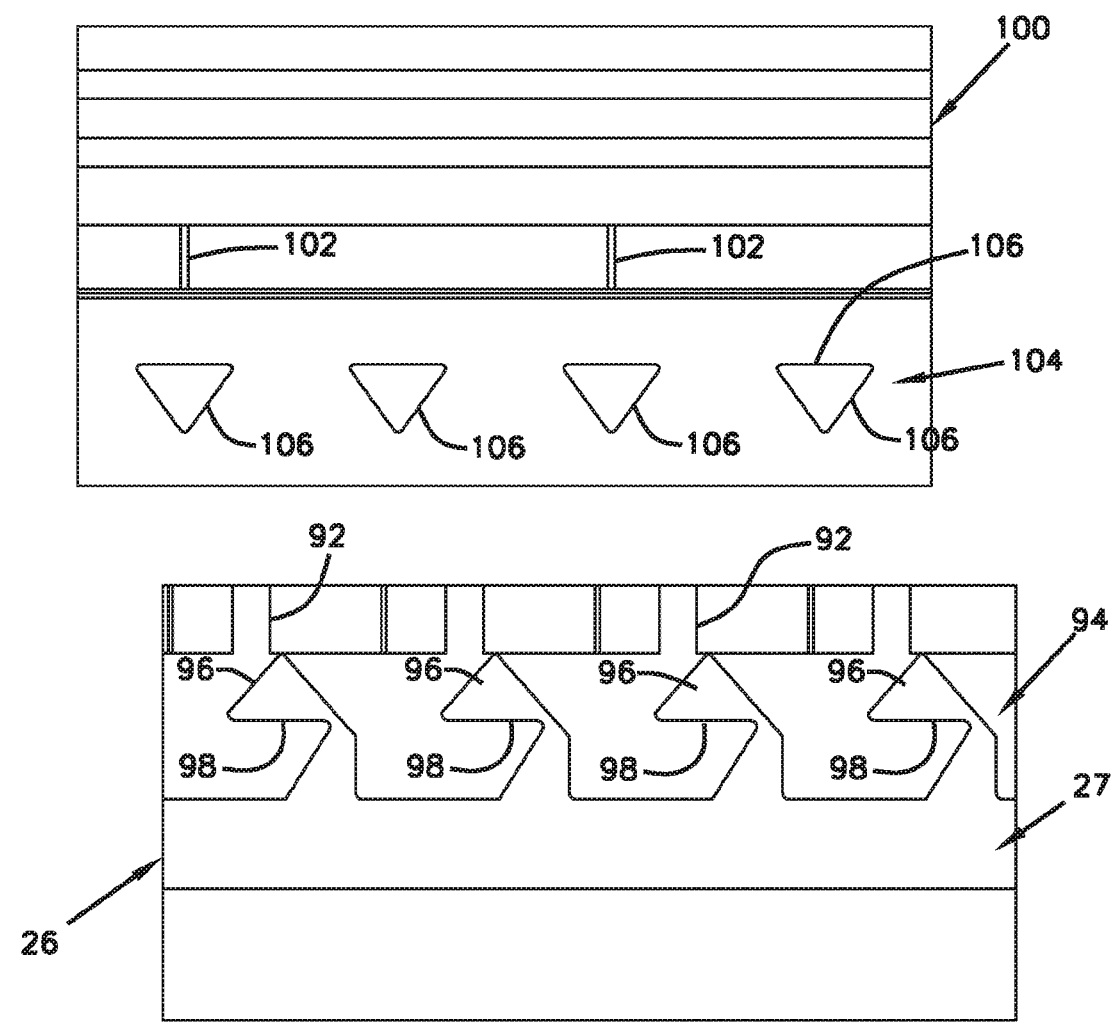
FIGS. 24-26 depict a sequence of steps for interlocking the interior and exterior coupling arrangements of FIGS. 22 and 23.
Figure 25:
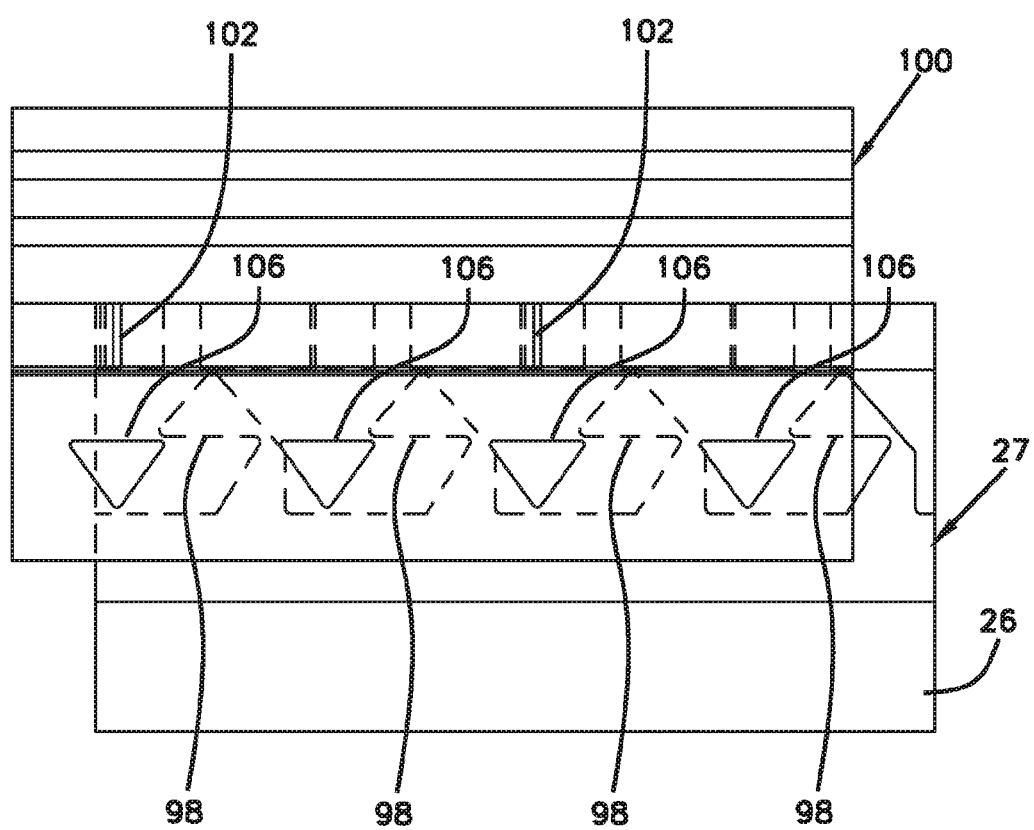
Figure 26:
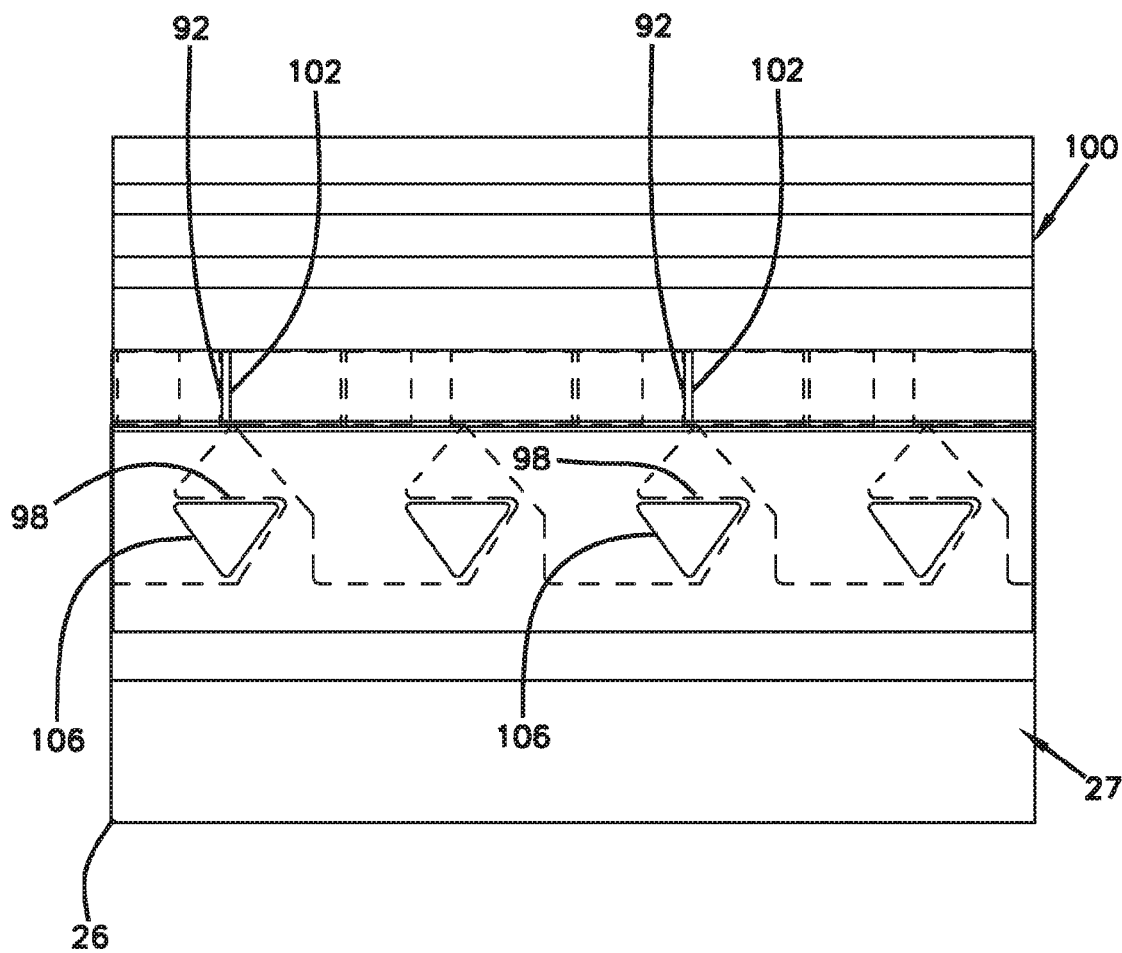

FIGS. 24-26 depict a sequence of steps for coupling together the interior coupling arrangement 26 and the exterior coupling arrangement 100. As shown at FIG. 24, the interior coupling arrangement 27 is aligned with the exterior coupling arrangement 100. FIG. 25 shows the interior and exterior coupling arrangements 27 from 100 inserted axially together, but in a non-coupled rotational position. FIG. 26 shows the interior and exterior coupling arrangements 27, 100 rotated from the non-coupled rotational position to a coupled rotational position. In the coupled rotational position of FIG. 26, the axial retention stops 106 of the external coupling arrangement 100 interlock with and oppose the stop surfaces 98 of the axial stops 96 of the internal coupling arrangement such that interference between the stops 96, 106 prevents the turn-to-secure fastener 26 from being axially disengaged from the exterior coupling arrangement 100 in a removal direction 107 is opposite from an insertion direction 108. Additionally, when the turn-to-secure fastener 26 is rotated from the non-coupled rotational position to the coupled rotational position, the snap-fit features 86 snap-past the snap-fit features 102 of the exterior coupling arrangement 100 such that opposition between a stop surface 103 of the snap-fit feature 102 and the stop surface 92 of the snap-fit feature 86 to prevents or resists movement of the turn-to-secure fastener 26 from the coupled rotational position to the un-coupled rotational position. Further disclosure of the coupling arrangements can be found in U.S. Provisional Patent Application 62/849,760, which is hereby incorporated by reference in its entirety.

Referring to FIG. 1, the first hardened connector shroud and fastener arrangement 34 includes a shroud 182 adapted to mount over the core 23 and a fastening member 140 that rotationally mounts over the shroud 182. The seal 30 seals between the outside of the core 23 and the inside of the shroud 182 when the core 23 is inserted in the shroud 182. The fastening member 140 is depicted as an outer housing having a bayonet-type interface (e.g., bayonet pins) adapted to engage with bayonet slots of the corresponding fiber optic adapter 41 when the fiber optic connector assembly (i.e., the assembly including the core 23 and the arrangement 34) is coupled to the fiber optic adapter 41. The shroud 182 includes a keying structure in the form of a slot 143 that mates with a corresponding projection in the fiber optic adapter 41 when the fiber optic connector assembly 40 is mated with the fiber optic adapter. In this way, the keying structure ensures that the fiber optic connector assembly is inserted into the fiber optic adapter at a desired rotational orientation. The turn-to-secure fastener 26 is adapted fit over the rear end of the shroud 182 and interlock with the coupling arrangement 80 to couple the connector core 23 to the shroud 182 such that the fastener 26 axially retains the core 26 within the shroud 182.

Referring still to FIG. 1, the second hardened connector shroud and fastener arrangement 36 includes a shroud 184 and an outer fastening member 145 depicted as a coupling nut having external threads. The seal 30 seals against the inside of the shroud 184 when the core 26 is secured in the shroud 184. The shroud 184 includes a pair of front paddles 147 adapted to provide a keying function for rotationally aligning the fiber optic connector assembly (i.e., the assembly which includes the core installed within the arrangement 36) within the corresponding fiber optic adapter 43. The exterior threads of the outer fastening member 145 are adapted to engage with corresponding interior threads of the fiber optic adapter 43 to secure the fiber optic connector assembly within the fiber optic adapter 43. The turn-to-secure fastener 26 is adapted fit over the rear end of the shroud 184 and interlock with the coupling arrangement 81 to couple the connector core 23 to the shroud 184 such that the fastener 26 axially retains the core 26 within the shroud 184.

Figure 4:
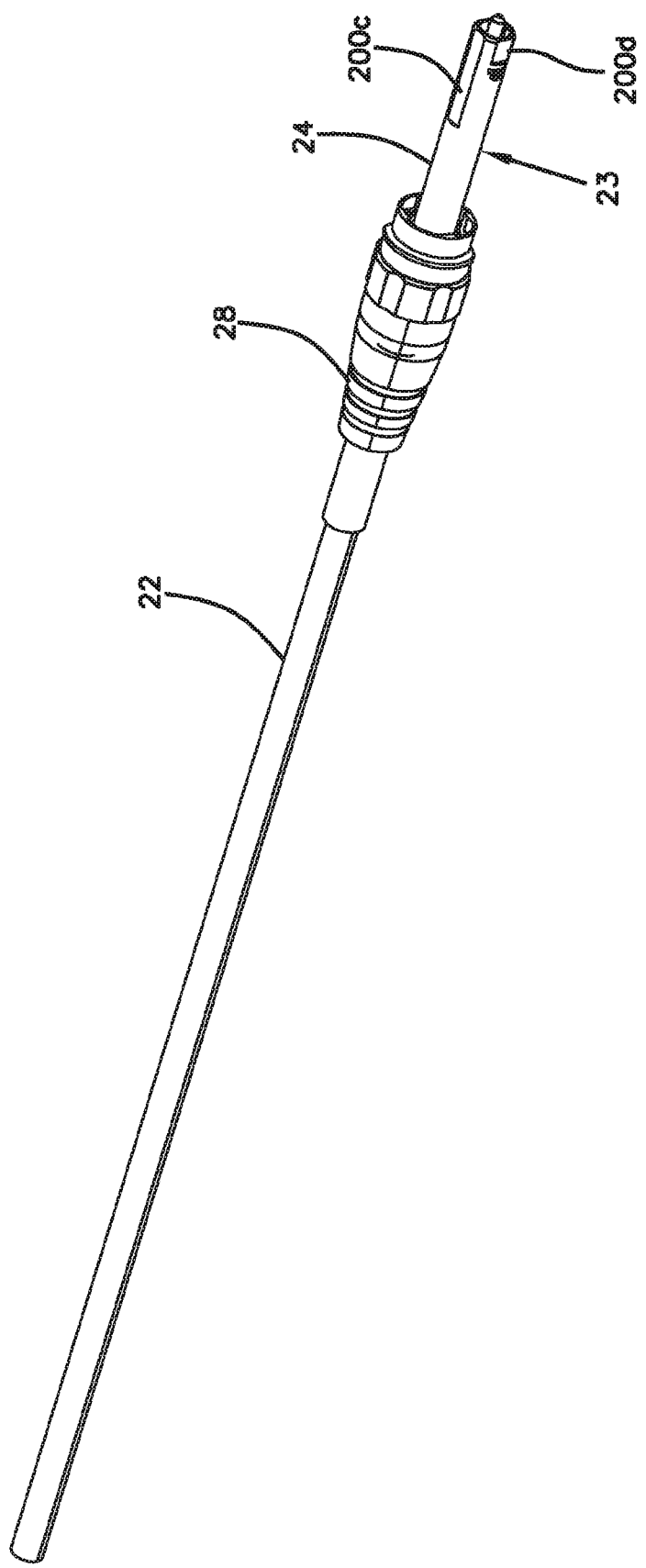
FIG. 4 is another perspective view of the connector core of FIG. 2; cross-sectional view taken longitudinally through the second fiber optic connector assembly of FIG. 2.

Referring to FIGS. 3 and 4, the front plug end 52 of the connector core 23 has a form factor compatible with the fiber optic adapter 41, the fiber optic adapter 43 and the small form-factor adapter 38. While the front plug end 52 is compatible with the fiber optic adapters 41, 43, the first and second hardened connector shroud and fastener arrangements 34, 36 are respectively needed to secure and seal the connector core 23 within the fiber optic adapters 41, 43. In contrast, the connector core 23 can be installed directly within the small form-factor adapter 38 without any intermediate shrouds and without requiring any fasteners in addition to the turn-to-secure fastener 26. Specifically, when the connector core 23 is secured within the small form-factor adapter 38, the seal 30 forms a seal with the small form-factor adapter 38 and the turn-to-secure fastener 26 couples directly to coupling arrangement 82 of the small form fiber optic adapter 38.

Referring to FIGS. 3 and 4, the front plug end 52 includes a plurality of flats 200a-200d positioned about the exterior of the core housing 24. Flats 200a and 200c are positioned opposite from one another, while flats 200b and 200d are position opposite from one another. Flats 200a, 200c extend rearwardly from the front end of the core housing 24 for a substantial length of the total length of the core housing 24. In one example, the flats 200a, 200c extend along at least 20% of a total length of the core housing 24. Flat 200a extends from the front end of the core housing 24 to an elongate key 202. The elongate key 202 is depicted as a rail that projects outwardly from an exterior of the main body of the core housing 24. In one example, the key 202 has a length that extends from the flat 200a rearwardly to adjacent the seal 30. In one example, the elongate key extends along at least 25 percent of the total length of the core housing 24.

Figure 5:
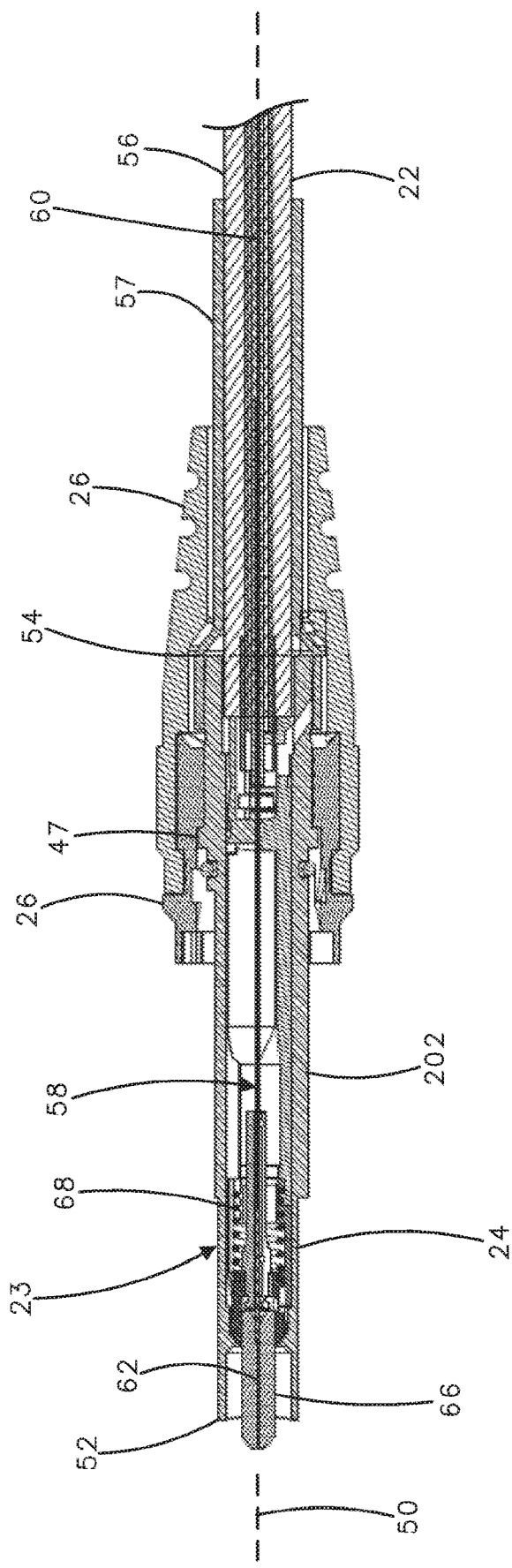
FIG. 5 is a cross-sectional view taken longitudinally through the connector core of FIG. 2.

The seal 30 is preferably positioned rearward of a longitudinal midpoint of the core housing 24. Preferably, the seal 30 is positioned closer to the rear end of the core housing 24 then the front end of the core housing 24. In a preferred example, the seal 30 is positioned rearward of at least two thirds of a total length of the core housing 24. As depicted at FIG. 5, the seal 30 is positioned within an interior of the turn-to-secure fastener 26.

The flats 200b, 200d are substantially shorter in length then the flats 200a, 200c. As depicted at FIG. 3, the flats 200b, 200d are positioned opposite from one another and define the sides that extend between the flats 200a, 200c.

The coupling arrangements 80, 81 provided on the shrouds 182, 184 of the first and second hardened connector shroud and fastener arrangements 34, 36 can have a configuration like the external coupling arrangement 100 shown at FIG. 23. For example, as shown FIG. 1, the exterior coupling arrangements 80, 81 each include the axial retention arrangement 104 including the plurality of the axial retention stops 106 (e.g., triangular stops) that are positioned circumferentially about the exteriors of the shrouds 182, 184 adjacent the rear ends of the shrouds 182, 184. The exterior coupling arrangements 80, 81 also includes snap-fit features 102a. In the depicted example, the snap-fit features 102a include flexible beams having opposite ends integrated with the shrouds 182, 184 and open spaces beneath the beams. In other example, cantilever style beams could be used. The beams can be oriented transverse to the circumferential direction (as shown) or parallel to the circumferential direction.

When the turn-to-secure fastener 26 is inserted axially over the exterior coupling arrangements 80, 81 and then turned from the non-coupled rotational portion to the coupled rotational position, the ramp surfaces 90 of the snap-fit features 86 of the turn-to-secure fastener 26 ride over the snap-fit features 102a causing the features 102a to deflect radially inwardly to allow the snap-fit features 86 to move past the snap-fit features 102a. When the turn-to-secure fastener 26 reaches the coupled rotational position the snap-fit features 86 concurrently move past the snap-fit features 102a such that the snap-fit features 102a elastically return to their non-deflected position. In the non-deflected position, opposition between the stop surfaces 92 of the snap-fit features 86 and the snap-fit features 102a prevents the turn-to-secure fastener 26 from being rotated from the coupled rotational position back to the non-coupled rotational position. In the coupled rotational position, the stops 96 of the turn-to-secure fastener 26 oppose the axial stops 106 to prevent the fastener 26 from being axially disengaged. If sufficient torque is applied to the turn-to-secure fastener 26, the snap-fit features 102a will break thereby allowing the turn-to-secure fastener 26 to be rotated from the coupled rotational position back to the non-coupled rotational position. It will be appreciated that the exterior coupling arrangement 81 on the shroud 184 of the second hardened connector shroud and fastener arrangement 36 has the same configuration as the exterior coupling arrangement 80. Thus, the core 23 can be attached to the first and second hardened connector shroud and fastener arrangements 34, 36 in the same manner. In other examples, the snap-fit features 102a may be configured for multiple uses.

FIGS. 6-14 depict the small form-factor adapter 38. The small form-factor adapter 38 is adapted to mount within a mounting opening 210. In certain examples, mounting opening 210 can be defined in a panel, through the wall of an enclosure, or in another structure. Preferably, the mounting opening 210 is relatively small in size. In one example, mounting opening 210 has an area less than or equal to 150 square millimeters. It will be appreciated that the small form-factor adapter 38 has a length L that is relatively long when taking into consideration the relatively small area of the mounting opening 210. In certain examples, the ratio of the area of the mounting opening 210 in millimeters and the length L of the small form-factor adapter 38 in millimeters is less than or equal to 3.

Figure 6:
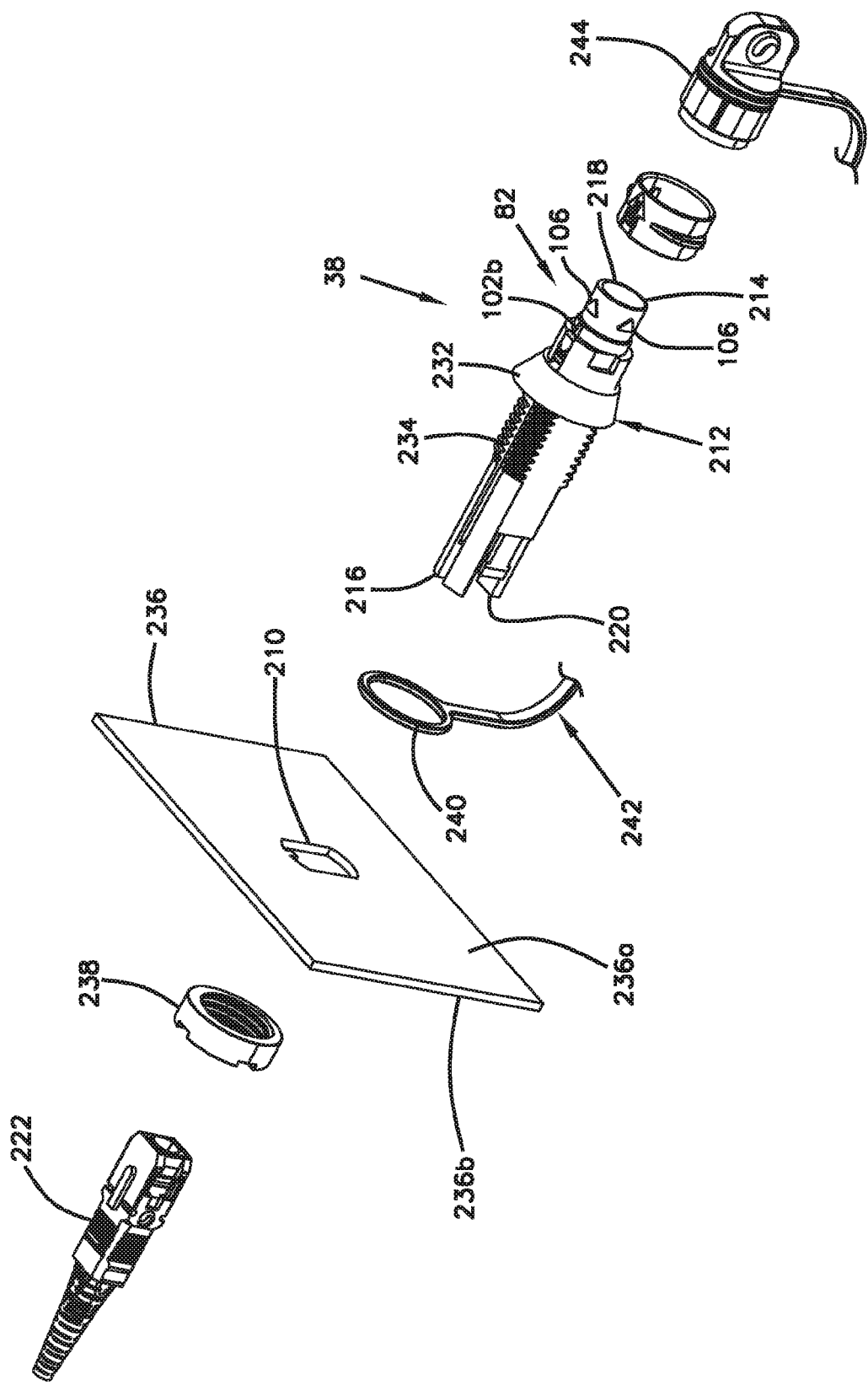
FIG. 6 is an exploded view of a small form-factor fiber optic adapter of the system of FIG. 1.
Figure 7:
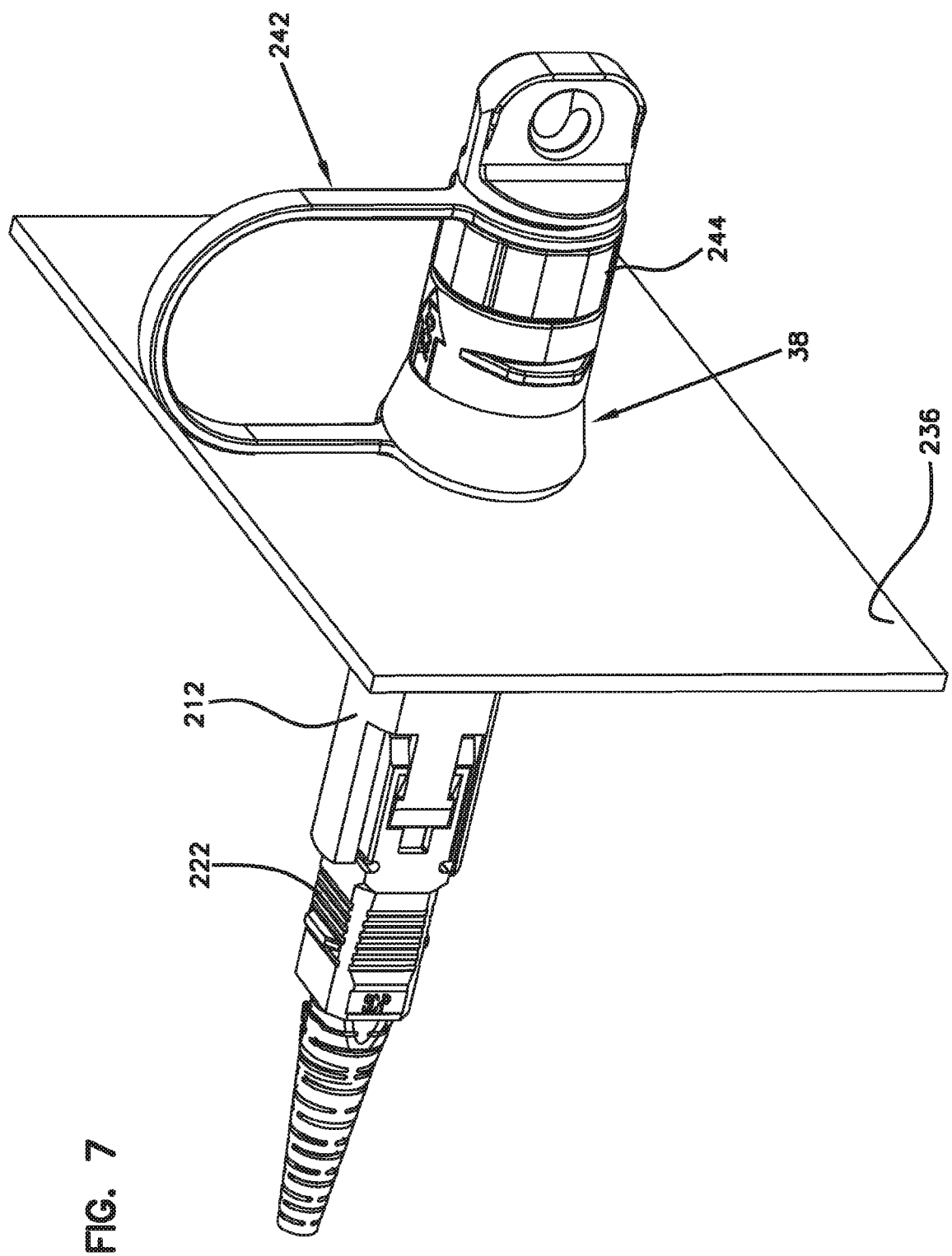
FIG. 7 is perspective view showing a ruggedized port of the small form-factor fiber optic adapter of FIG. 6 covered by a dust cap.
Figure 8:
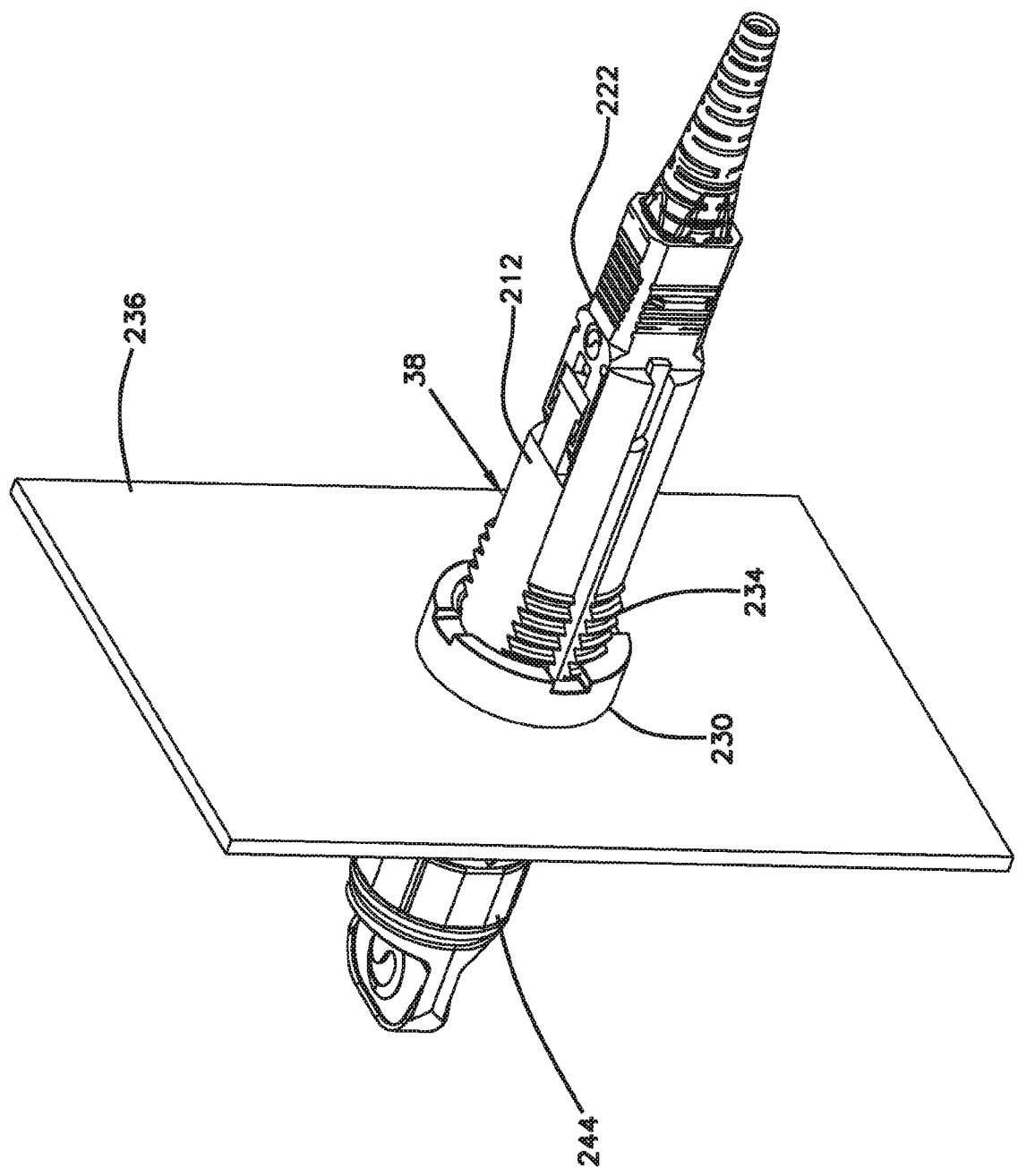
FIG. 8 is a perspective view showing a non-ruggedized port of the small form-factor fiber optic adapter of FIG. 6 with a non-ruggedized fiber optic connector secured therein.
Figure 9:
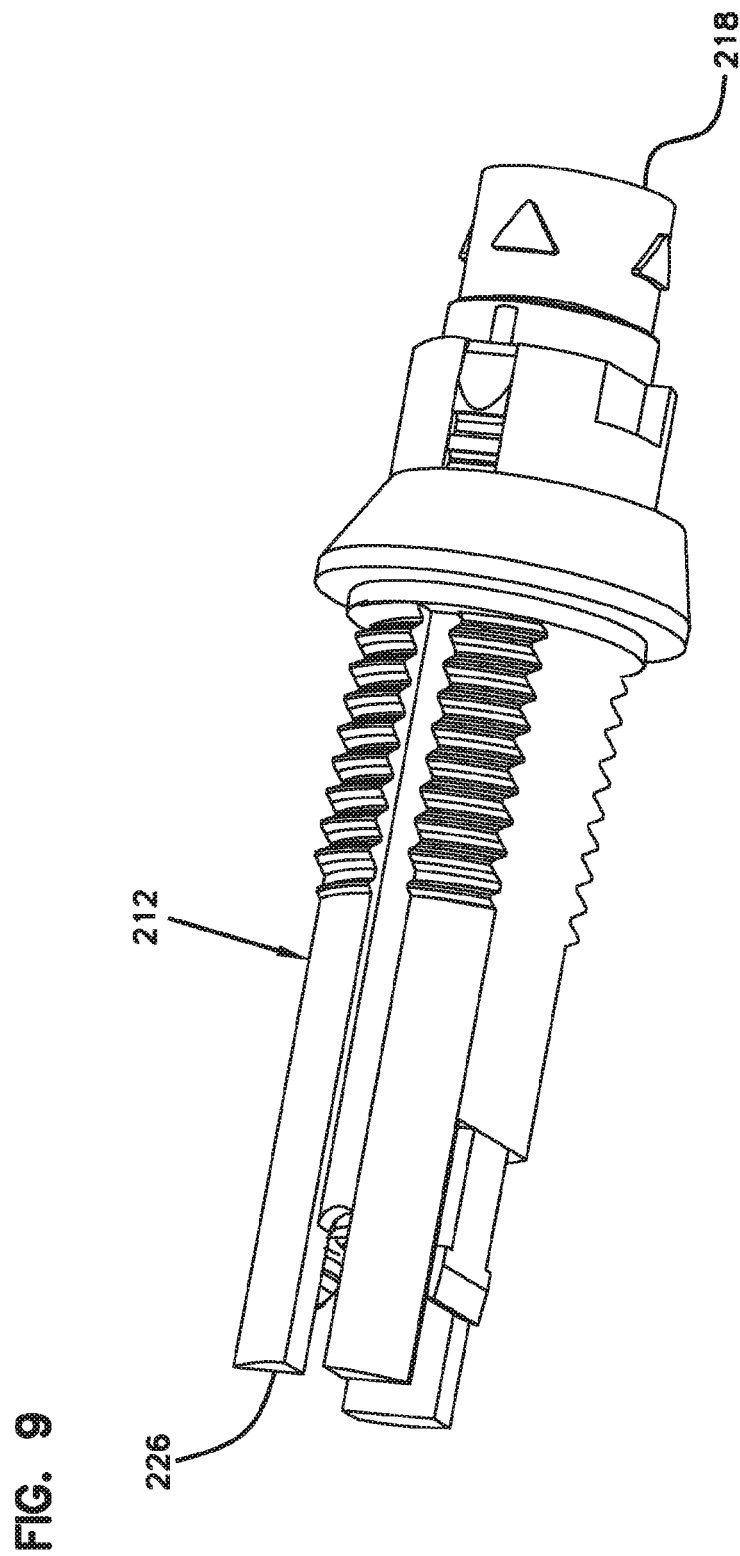
FIG. 9 is a perspective view of a main body of the small form-factor fiber optic adapter of FIG. 6.
Figure 10:
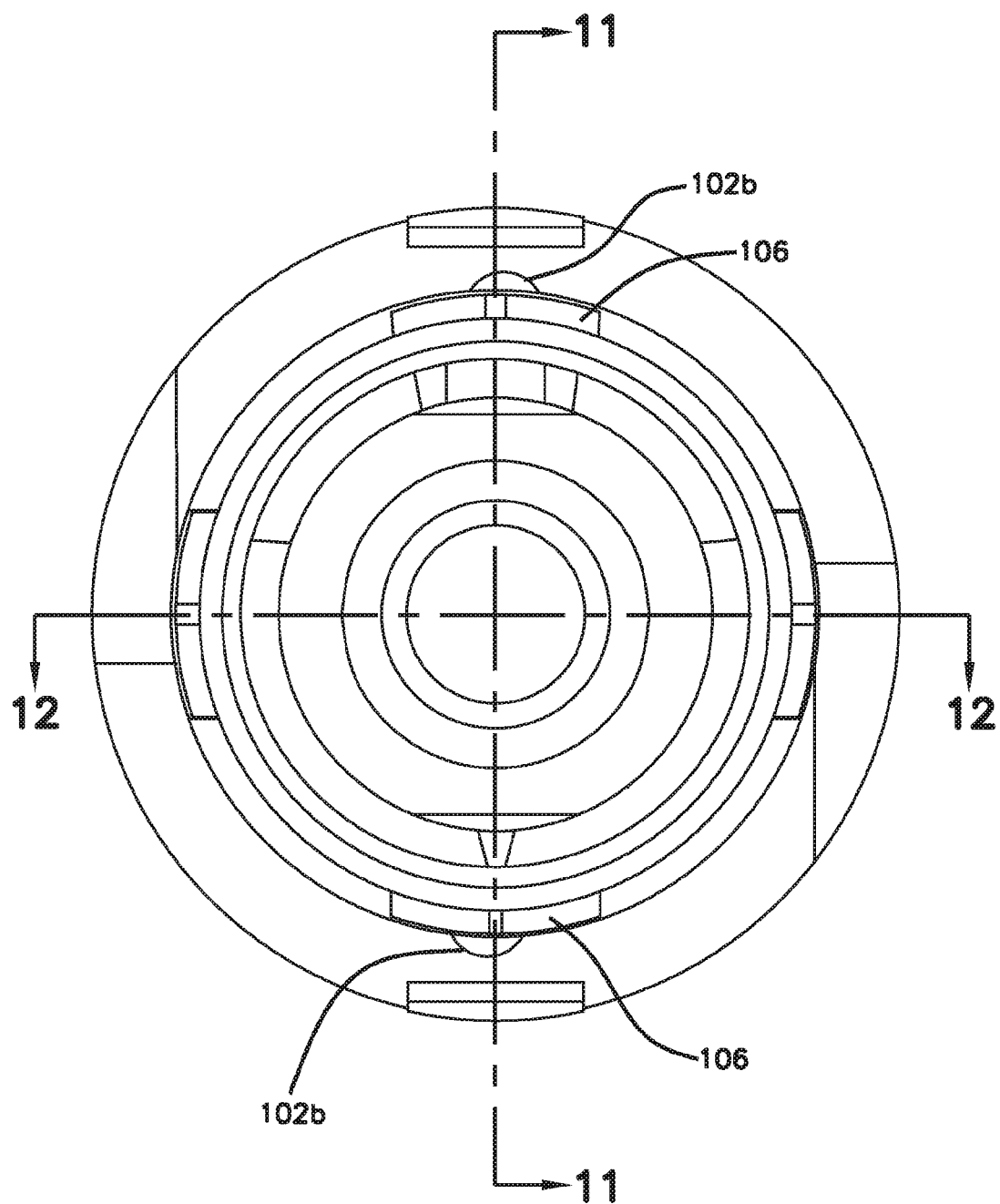
FIG. 10 is an end view of the ruggedized port of the small form-factor fiber optic adapter of FIG. 6.
Figure 11:
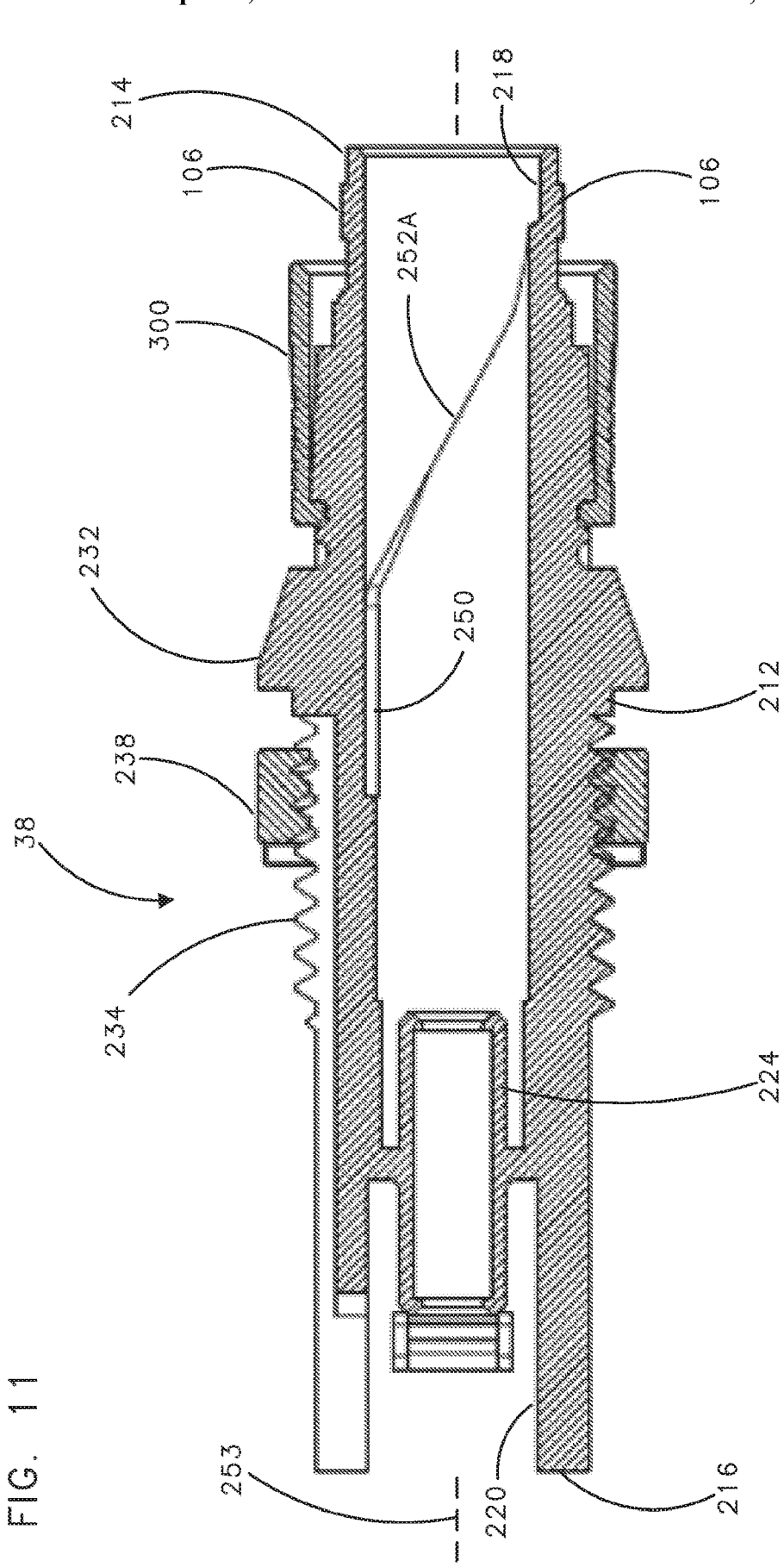
FIG. 11 is a cross-sectional view taken along section line 11-11 of FIG. 10.
Figure 12:
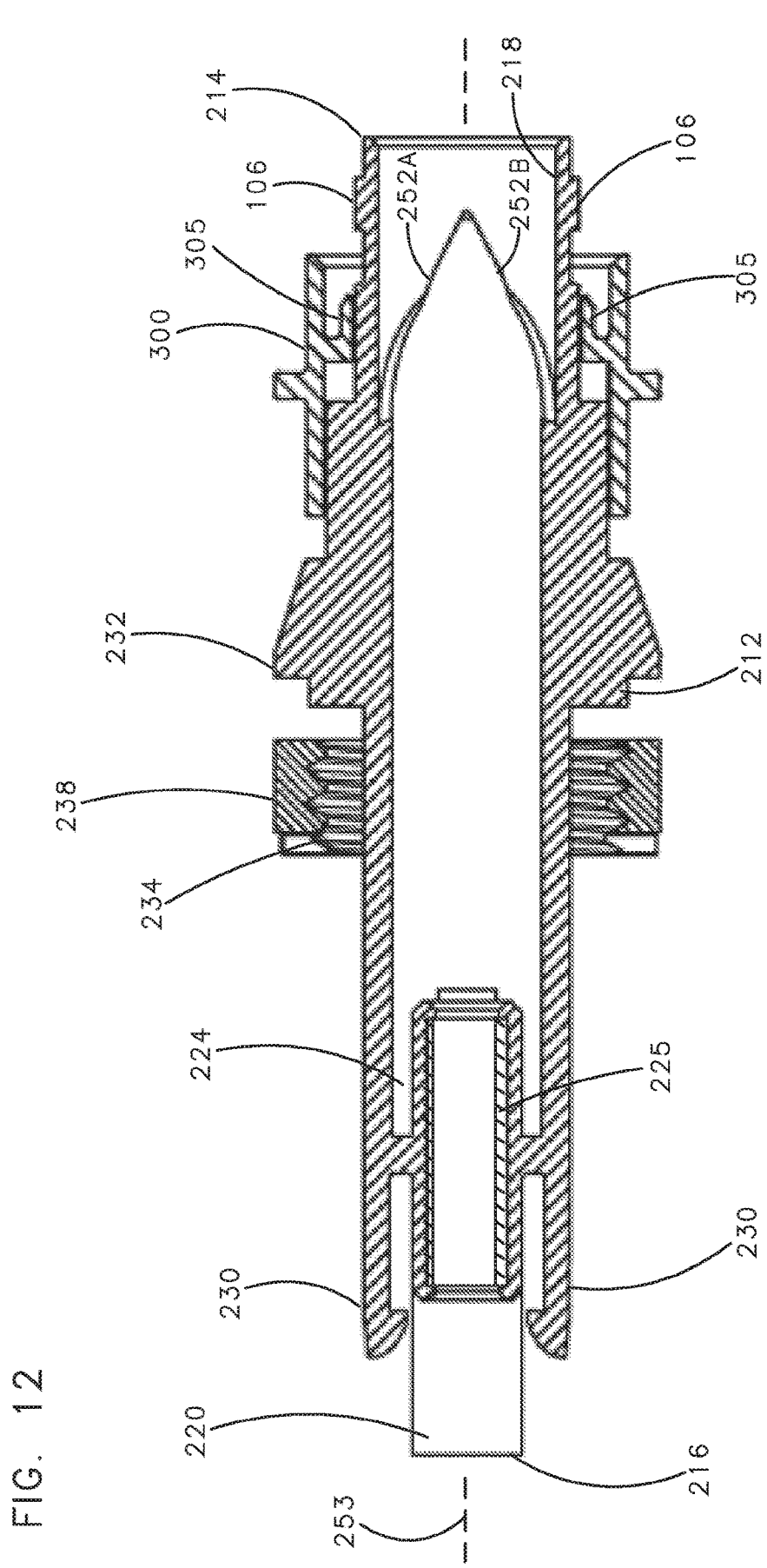
FIG. 12 is a cross-sectional view taken along section line 12-12 of FIG. 10.
Figure 13:
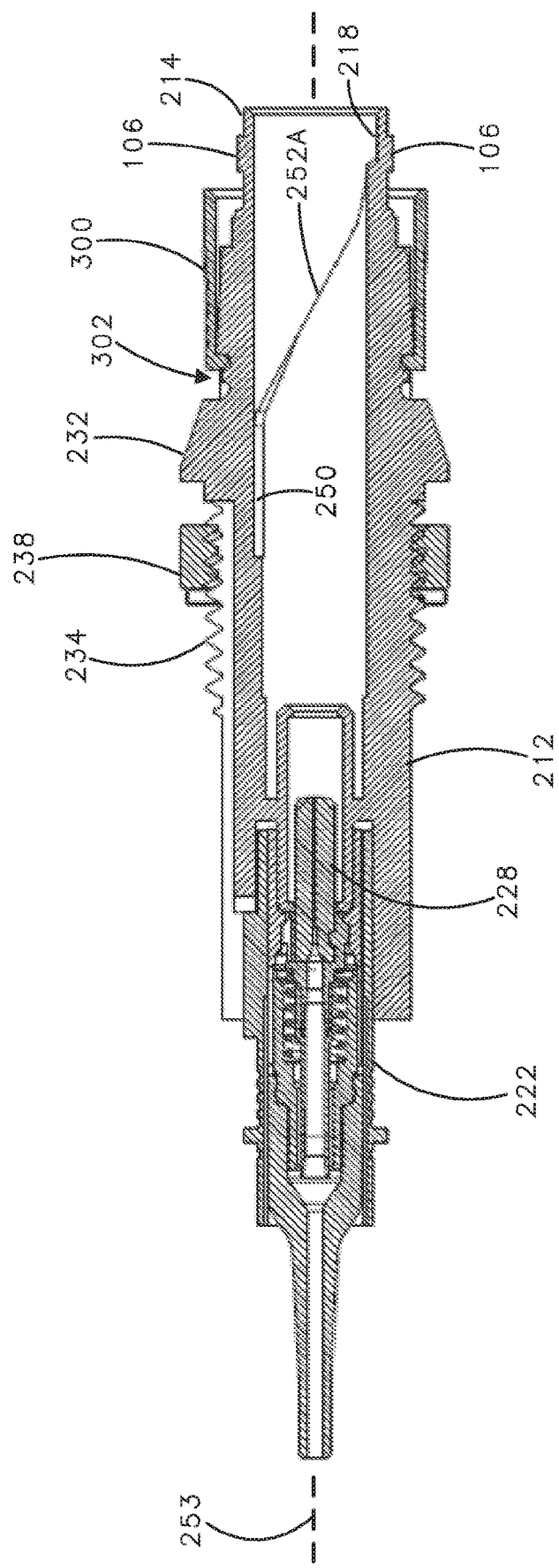
FIG. 13 is the cross-sectional view of FIG. 11 with a non-ruggedized fiber optic connector installed in the non-ruggedized port of the small form-factor fiber optic adapter.
Figure 14:
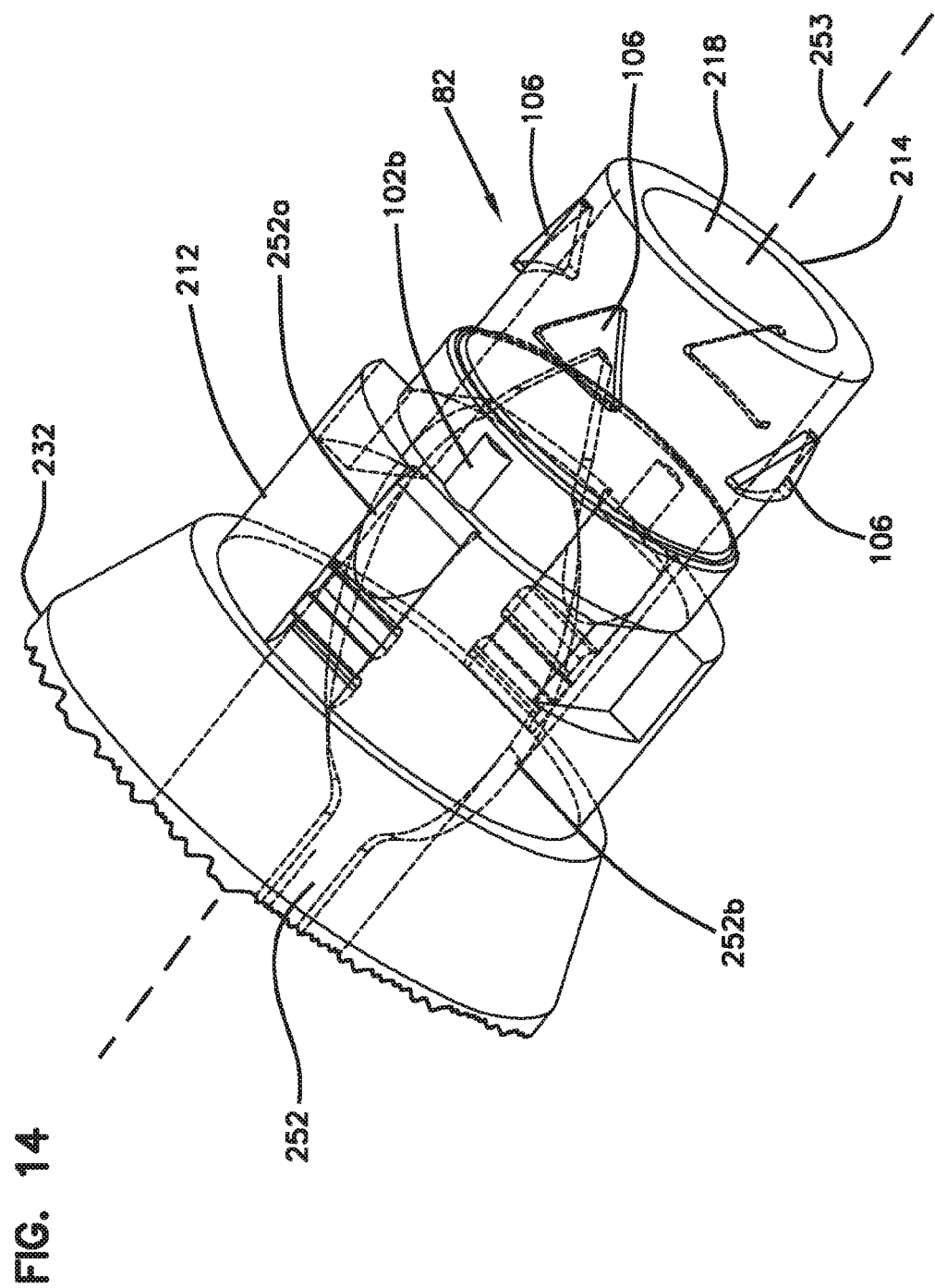
FIG. 14 depicts a portion of the small form-factor fiber optic adapter of FIG. 6 with internal helical keying guides shown in hidden line.
Figure 15:
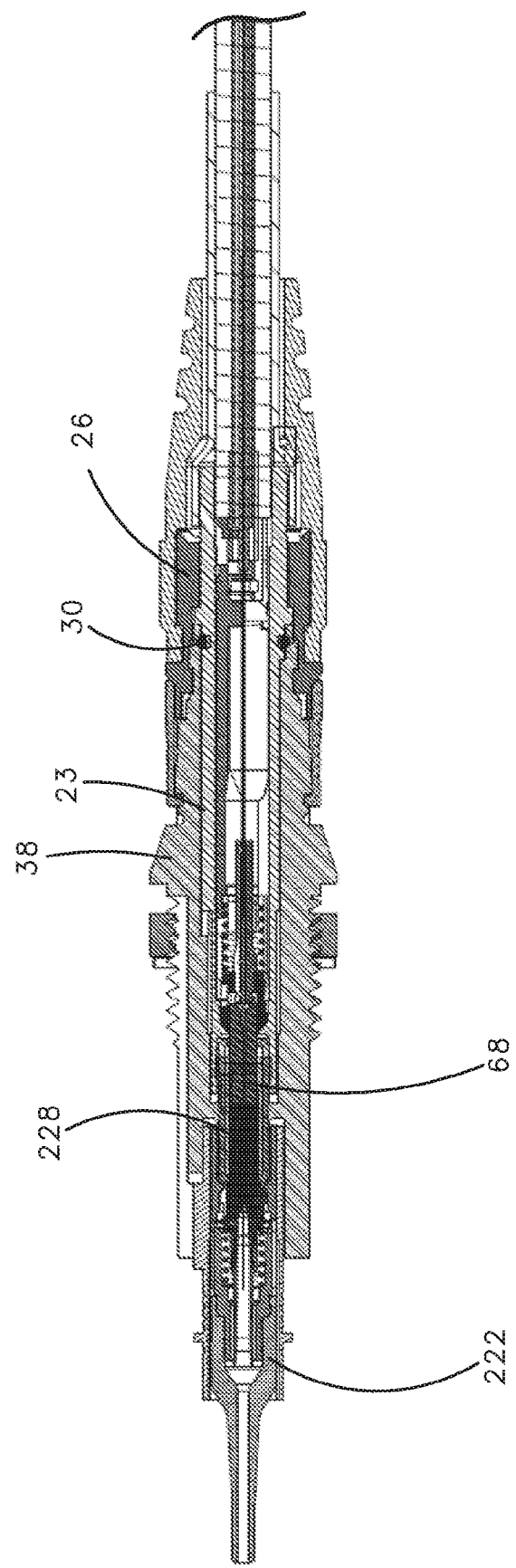
FIG. 15 is a cross-sectional view showing the connector core and the non-ruggedized fiber optic connector optically coupled to each other by the small form-factor fiber optic adapter.
Figure 18:
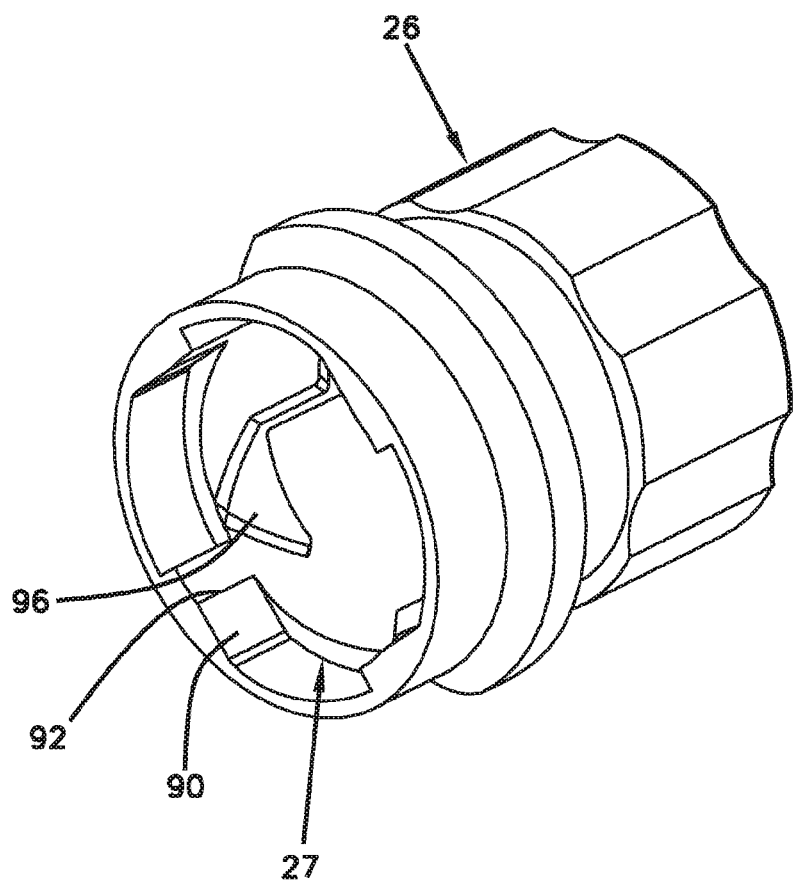
FIG. 18 is a perspective view of a turn-to-secure fastener of the connector core of FIG. 10.
Figure 19:
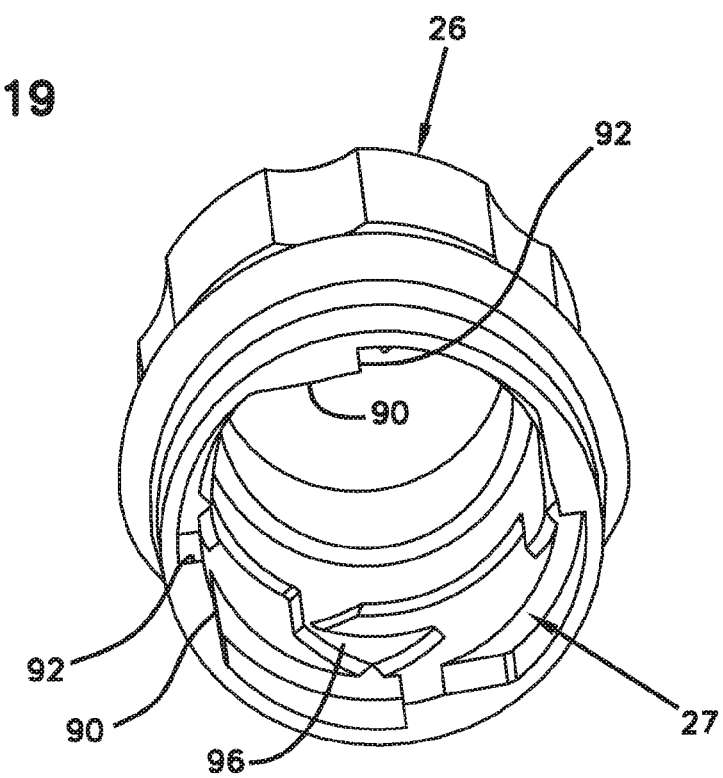
FIG. 19 is another perspective view of the turn-to-secure fastener of the connector core or FIG. 10.
Figure 20:
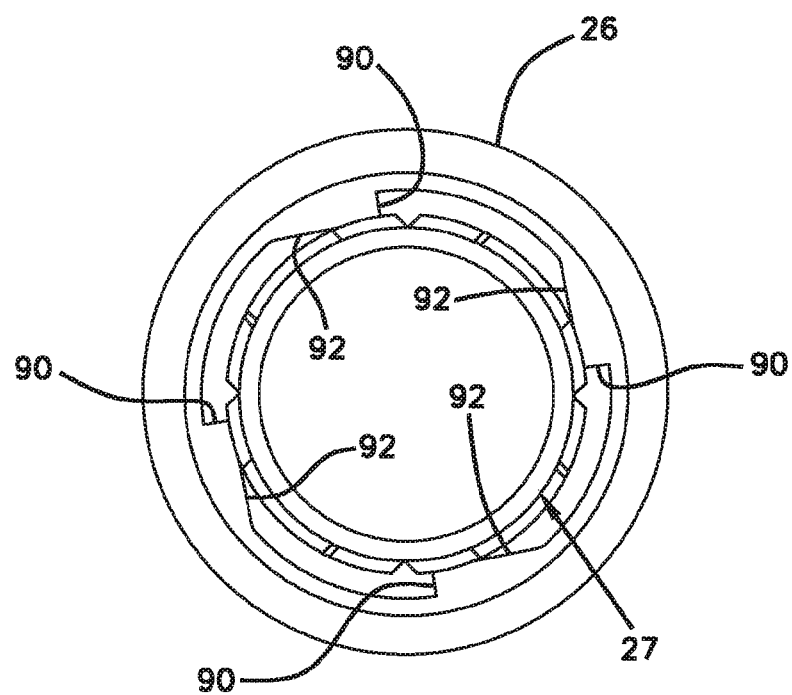
FIG. 20 is a further perspective view of the turn-to-secure fastener of the connector core or FIG. 10.
Figure 21:
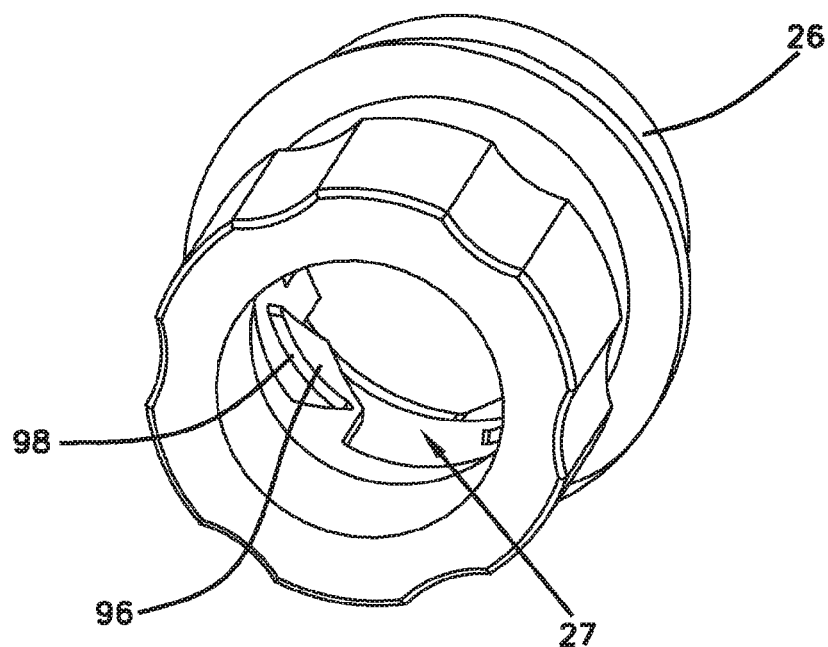
FIG. 21 is still another perspective view of the turn-to-secure fastener of the connector core or FIG. 10.

Referring to FIG. 6, the small form-factor 38 includes a main adapter body 212 having a first end 214 and a second end 216. The length L of the small form-factor adapter 38 extends between the first and second ends 214, 216. The first end 214 defines a ruggedized connector port 218 and can be referred to as a ruggedized end. The second end 216 defines a non-ruggedized connector port 220 and can be referred to as a non-ruggedized end. In certain examples, the adapter main body 212 can have a one-piece molded construction. The ruggedized connector port 218 can be configured to receive the connector core 23 and preferably has a form factor that matches or is otherwise compatible with the form factor of the connector core 23. The non-ruggedized connector port 220 is adapted to receive a non-ruggedized fiber optic connector such as an SC connector 222.

The main adapter body 212 includes an internal sleeve holder 224. In certain examples, the internal sleeve holder 224 can contain a ferrule alignment sleeve such as a split-sleeve 225 made of an elastic material (e.g., phosphor bronze, zirconia ceramic, etc.). In certain examples, the internal sleeve holder 224 can include a plurality of fingers that can be flexed open to allow the split sleeve to be inserted within and retained inside the internal sleeve holder 224.

When the non-ruggedized fiber optic connector 222 is secured in the non-ruggedized connector port 220 and the connector core 223 is secured within the ruggedized connector port 218, the connector core 23 and non-ruggedized fiber optic connector 222 are optically connected together. For example, a ferrule 228 of the non-ruggedized fiber optic connector 222 can be received within one end of the ferrule alignment sleeve housed within the sleeve holder 224, and the ferrule 66 of the connector core 23 can be received within the opposite end of the ferrule alignment sleeve housed within the sleeve holder 224 such that the fiber alignment sleeve coaxially aligns the two ferrules 228, 66 to provide an optical connection between the optical fibers held by each of the ferrules 228, 66.

The second end 216 of the main adapter body 212 includes integrated latches 230 for retaining the non-ruggedized fiber optic connector 222 within the non-ruggedized connector port 220. The main adapter body 212 also includes an outer flange 232 and exterior threads 234. When the main adapter body 212 is secured within the mounting opening 210 defined by a structure such as a panel 236, the flange 234 engages a first side 236a of the panel 236 while a nut 238 is threaded on the outer threads 232 and engages a second side 236b of the panel. In this way, the panel 236 is compressed between the outer flange 232 and the nut 238 to secure the main adapter body 212 to the panel 236.

A seal 240 can be pressed between the flange 232 and the first side 236a of the panel 236. In one example, the seal 240 can be integrated with a lanyard 242 used to couple a dust cap 244 to the main adapter body 212. The dust cap 244 is adapted to be secured over the first end 214 of the main adapter body 212 to enclose the ruggedized connector port 218 prior to inserting the connector core 23 therein. It will be appreciated that the dust cap 244 can be removed from the first end 214 of the main adapter body 212 to allow insertion of the connector core 23 into the ruggedized connector port 218. It will also be appreciated that the dust cap 244 can include an internal coupling arrangement of the type shown at FIG. 22 that is adapted to couple with the exterior coupling arrangement 82 provided adjacent the first end 214 of the main adapter body 212.

Referring to FIGS. 11-14, the main adapter body 212 includes a keyway 250 for receiving the elongate key 202 of the connector core 23. The main adapter body 212 also includes internal structure for rotationally guiding the keying rail to the keyway 250. In certain examples, the structure for providing rotational guiding can include two helical shoulders 252a, 252b that rotate in opposite helical directions about a central longitudinal axis 253 of the main adapter body 212 as the shoulders 252a, 252b extend along the axis 253 in a direction from the first end 214 to the second end 216 of the main adapter body 212. In certain examples, the helical guiding shoulders 252a, 252b provide for rotational guiding of the connector core 23 as the connector core 23 is inserted into the ruggedized connector port 220 along a rotational range of movement of at least 90 degrees, or at least 135 degrees, or at least 170 degrees, or about 180 degrees. As depicted, the helical shoulders 250a, 250b start adjacent of the bottom ruggedized connector port 220 and helically rotate approximately 180 degrees in opposite directions until the shoulders meet adjacent the keyway 250 at the top of the ruggedized connector port 218. In this way, the helical shoulders 252a, 252b are configured to rotationally guide the connector core 23 toward the keyway 250 as via contact with the key 202 to rotationally guide the key 202 to the keyway 250 regardless of the rotational orientation the connector core 23 is initially inserted into the ruggedized connector port 218.

As indicated above, the first end 214 of the main adapter body 212 includes the exterior coupling arrangement 82. In the depicted example, the exterior coupling arrangement 82 includes an axial retention arrangement of the type depicted by the exterior coupling arrangement 100. For example, a plurality of the axial stops 106 are provided about the circumference of the main adapter body 212. The exterior coupling arrangement 82 also includes a snap-fit feature 102b adapted to engage the snap-fit feature 86 of the turn-to-secure fastener 26 to retain the turn-to-secure fastener 26 in the coupled rotational orientation. In the depicted example, the snap-fit feature 102b is a detent (e.g., a bump) over which the snap-fit feature 86 rides as the turn-to-secure fastener 26 is rotated relative to the exterior coupling arrangement 82 from the non-coupled rotational position to the coupled rotational position. It will be appreciated that the snap-fit feature 102b is a detent having angled surfaces on both sides. Thus, the configuration of the snap-fit feature 102b allows the turn-to-secure fastener 26 to be rotated from the coupled rotational position back to the non-coupled rotational position when sufficient torque is applied to the force the snap-fit feature 86 of the turn-to-secure fastener 26 back over the snap-fit feature 102b. Preferably, the snap-fit feature 102b does not break when the turn-to-secure fastener 26 is rotated from the coupled rotational position back to the non-coupled rotational position. Instead, flexing of the turn-to-secure fastener 26 and/or the snap-fit feature 102b allows the turn-to-secure fastener 26 to be moved from the coupled rotational position back to the non-coupled rotational position.

In certain examples, the small form-factor adapter 38 further includes a retention collar 300 that mounts over the exterior of the main adapter body 212 adjacent the first end 214. The retention collar 300 is non-rotatably mounted relative to the main adapter body 212 such that the retention collar 300 cannot be rotated about the central axis of the main adapter body 212. The retention collar 300 is moveable between an extended position (see FIG. 17) and a retracted position (see FIG. 16). A detent 302 is provided for retaining the retention collar 300 in the extended position and in the retracted position. When the retention collar 300 is moved to the extended position while the turn-to-secure fastener 26 is in the coupled rotational position relative to the exterior coupling arrangement 82, retaining member 305 (e.g., fingers) inside the retention collar 300 extend within the interior of the turn-to-secure fastener 26 and oppose the stop surfaces 92 of the interior coupling arrangement of the turn-to-secure fastener 26. In this way, the retention collar 300 prevents the turn-to-secure fastener 26 from being rotated from the coupled rotational position back to the non-coupled rotational position. In contrast, when the retention collar 300 is moved to the retracted position, the retaining members 305 disengage from the stop surfaces 92 thereby allowing the turn-to-secure fastener 26 to be rotated from the coupled rotational position back to the non-coupled rotational position when sufficient torque is applied to the turn-to-secure fastener 26 to overcome the detent 102b and move the turn-to-secure fastener 26 from the coupled rotational position back to the non-coupled rotational position.

In certain examples, the retention collar 300 can be spring biased toward the extended position. In this way, the retention collar 300 can automatically move from the retracted position to the extended position once the fastener 26 is turned from the non-coupled rotational state to the coupled rotational state. To de-couple the fastener 26, the collar 300 can be manually slid from the extended position the retracted position against the bias of the spring to allow for rotation of the fastener 26 from the coupled rotational state to the non-coupled rotational state. Insertion of the core assembly into the adapter 38 can cause movement of the collar 300 from the extended position to the retracted position (e.g., via physical contact between the retaining sleeve and the core assembly) against the bias of the spring.

What is claimed is:

1. A fiber optic connector system comprising:
    a connector core including a front end defining a plug portion and rear end defining a cable anchoring location, the connector core including a core seal;
    a first ruggedized exterior assembly configured to be mounted over the connector core, the first ruggedized exterior assembly including a first shroud configured to be mounted in over the connector core with the core seal providing sealing between the connector core and the first shroud, the first shroud having a forward end that includes a first keying arrangement for rotationally keying the first shroud relative to a first ruggedized fiber optic adapter, the first ruggedized exterior assembly also including a first ruggedized fastening element for securing the first ruggedized exterior assembly to the first ruggedized fiber optic adapter, the first shroud having a first exterior coupling arrangement at an exterior of the first shroud adjacent a rear end of the first shroud;
    a second ruggedized exterior assembly configured to be mounted over the connector core, the second ruggedized exterior assembly including a second shroud configured to be mounted over the connector core with the core seal providing sealing between the connector core and the second shroud, the second shroud having a forward end that includes a second keying arrangement for rotationally keying the second shroud relative to a second ruggedized fiber optic adapter, the first keying arrangement having a different keying configuration than the second keying arrangement, the second ruggedized exterior assembly also including a second ruggedized fastening element for securing the second ruggedized exterior assembly to the second ruggedized fiber optic adapter, the first ruggedized fastening element having a different fastening configuration than the second ruggedized fastening element, the second shroud having a second exterior coupling arrangement at an exterior of the second shroud adjacent a rear end of the second shroud;
    the first ruggedized exterior assembly being usable in combination with the connector core to make the fiber optic connector system compatible with the first ruggedized fiber optic adapter;
    the second ruggedized exterior assembly being usable in combination with the connector core to make the fiber optic connector system compatible with the second ruggedized fiber optic adapter;
    the connector core having a form factor that complements a form factor of a third ruggedized fiber optic adapter such that the connector core is directly compatible with the third ruggedized fiber optic adapter without using a ruggedized exterior assembly, the core seal providing sealing between the third ruggedized fiber optic adapter and the connector core when the connector core is inserted in the third ruggedized fiber optic adapter, the third ruggedized fiber optic adapter including a third exterior coupling arrangement at an exterior of the third ruggedized fiber optic adapter; and
    a turn-to-secure fastener carried with the connector core for: a) coupling the connector core to the first shroud by inserting the turn-to-secure fastener over the rear end of the first shroud and coupling the turn-to-secure fastener with the first exterior coupling arrangement by turning the turn-to-secure fastener relative to the first shroud; b) coupling the connector core to the second rear shroud by inserting the turn-to-secure fastener over the rear end of the second shroud and coupling the turn-to-secure fastener with the second exterior coupling arrangement by turning the turn-to-secure fastener relative to the second shroud; and c) coupling the connector core to the third ruggedized fiber optic adapter by inserting the turn-to-secure fastener over the exterior of the third ruggedized adapter and coupling the turn-to-secure fastener with the third exterior coupling arrangement by turning the turn-to-secure fastener relative to the third ruggedized adapter.

2. The fiber optic connector system of claim 1, wherein the first keying arrangement includes paddles and the second keying arrangement includes an open ended slot.

3. The fiber optic connector system of claim 1, wherein the first ruggedized fastening element includes a threaded coupling nut and the second ruggedized fastening element includes a bayonet-style fastening sleeve.

4. The fiber optic connector system of claim 1, wherein a cable is anchored to the rear end of the connector core, wherein an optical fiber of the cable is supported by a ferrule positioned at the plug portion of the connector core, and wherein a shape-memory, heat shrink sleeve provides a seal between the cable and the connector core.

5. The fiber optic connector system of claim 1, wherein the connector core includes a core housing that extends from the front end to the rear end, and wherein the connector core includes an elongate keying rail that projects radially outwardly from a main body of the core housing and extends along at least 25 percent of a total length of the core housing.

6. The fiber optic connector system of claim 5, wherein a forward end of the elongate keying rail is offset from the front end of the core housing, and a rearward end of the elongate keying rail is located adjacent the core seal.

7. The fiber optic connector system of claim 6, wherein the main body of the core housing defines a flat that extends from the forward end of the elongate keying rail to the front end of the core housing along at least 20 percent of the total length of the core housing.

8. The fiber optic connector system of claim 1, wherein the core seal is positioned rearward of a longitudinal midpoint of the connector core.

9. The fiber optic connector system of claim 1, wherein the first and second exterior coupling arrangements have a first configuration, and the third exterior coupling arrangement has a second configuration different from the first configuration.

10. The fiber optic connector system of claim 9, wherein the first configuration is adapted for onetime use with the turn-to-secure fastener and the second configuration allows for multiple uses with the turn-to-secure fastener.

11. The fiber optic connector system of claim 10, wherein the first configuration includes a snap-fit retaining element that retains the turn-to-secure fastener in a coupled state with respect to the first or second shroud, and is required to be broken to rotate the turn-to-secure fastener from the coupled state to a non-coupled state.

12. The fiber optic connector system of claim 11, wherein the second configuration includes a detent retaining element that retains the turn-to-secure fastener in the coupled state with respect to the third ruggedized fiber optic adapter, but that allows the turn-to-secure fastener to be rotated from the coupled state to the non-coupled state without requiring breaking of the detent retaining element.

13. A fiber optic connection apparatus comprising:
a connector core including a core housing and a seal mounted on the core housing for sealing with respect to a structure adapted to receive the connector core, the structure including a shroud, a fiber optic adapter or a dust cap; and
a turn-to-secure fastener mounted on the connector core for securing the connector core to the structure, wherein the seal is positioned within an interior of the turn-to-secure fastener, wherein the turn-to-secure fastener includes an interior coupling arrangement including a plurality of ramped snap-fit features spaced uniformly about a central axis of the turn-to-secure fastener, wherein each of the ramped snap-fit features includes a ramp surface and a stop surface, and wherein the interior coupling arrangement further includes an axial retention arrangement including a plurality of axial stops spaced uniformly about the central axis, the axial stops defining apexes that face toward an open end of the turn-to-secure fastener.

14. The fiber optic connection apparatus of claim 13, wherein the seal is located at a rear third of a total length of the connector core, and wherein a ferrule is positioned at a front end of the connector core.

15. The fiber optic connection apparatus of claim 13, further comprising a keying rail integrated with the core housing that extends forwardly from the seal and extends along at least 25 percent of a total length of the core housing.

16. A fiber optic connection apparatus comprising:
a fiber optic adapter including a main body having a unitary, one-piece molded construction, the main body having a first end defining a ruggedized connector port and a second end defining a non-ruggedized connector port, wherein the main body includes an internal sleeve holder for holding a ferrule alignment sleeve, integrated latches for retaining a non-ruggedized fiber optic connector within the non-ruggedized connector port, and an outer flange, the main body being configured to be mounted in a mounting opening having a cross-sectional area less than or equal to 150 square millimeters.

17. The fiber optic connection apparatus of claim 16, wherein a ratio of the cross-sectional area of the mounting opening and a length of the fiber optic adapter in millimeters is less than or equal to 3.

18. The fiber optic connection apparatus of claim 16, wherein the fiber optic adapter includes an exterior retention arrangement adjacent the first end, the exterior retention arrangement including a snap-fit feature and also including a plurality of axial stops positioned about a circumference of the adapter main body.

19. The fiber optic connection apparatus of claim 16, wherein the main body includes an exterior threaded portion, wherein the mounting opening is defined through a wall, and wherein when the main body is mounted within the mounting opening the wall is compressed between the outer flange and a nut threaded on the exterior threaded portion.

20. The fiber optic connection apparatus of claim 19, further comprising a seal positioned between the outer flange and the wall to provide environmental sealing.

21. The fiber optic connection apparatus of claim 20, wherein the seal is integrated with a lanyard used to couple a dust cap to the main body.

22. The fiber optic connection apparatus of claim 16, further comprising a dust cap adapted to be secured over the first end of the main body to enclose the ruggedized connector port.

23. The fiber optic connection apparatus of claim 16, wherein the main body includes a keyway for receiving an elongate key of a connector core and internal helical shoulders configured to rotationally guide the elongate key of the connector core to the keyway.

24. The fiber optic connection apparatus of claim 16, further comprising a retention collar non-rotatably mounted over an exterior of the main body adjacent to the first end.

25. The fiber optic connection apparatus of claim 24, wherein the retention collar is moveable between an extended position and a retracted position, and wherein when in the extended position, the retention collar inhibits a turn-to-secure fastener from being rotated to a non-coupled position.

26. The fiber optic connection apparatus of claim 16, wherein the main body further defines a keyway configured to receive a tab extending into the mounting opening to inhibit rotation of the main body relative to the mounting opening.

27. The fiber optic connection apparatus of claim 16, wherein the main body defines two laterally opposed flat surfaces on an otherwise cylindrical body, the flat surfaces enabling partial passage of the main body through the mounting opening.

28. The fiber optic connection apparatus of claim 16, wherein the outer flange includes a stop surface configured to engage the wall and at least partially surround the mounting opening, the stop surface being positioned between the first end and the second end of the main body.

* * * * *